US012632919B2

(12) United States Patent
Lee et al.

(10) Patent No.: US 12,632,919 B2
(45) Date of Patent: May 19, 2026

(54) METHODS AND APPARATUS FOR SCALABLE PROCESSING

(71) Applicant: SoftEye, Inc., San Diego, CA (US)

(72) Inventors: Te-Won Lee, San Diego, CA (US); Edwin Chongwoo Park, San Diego, CA (US)

(73) Assignee: SoftEye, Inc., San Diego, CA (US)

( * ) Notice: Subject to any disclaimer, the term of this patent is extended or adjusted under 35 U.S.C. 154(b) by 210 days.

(21) Appl. No.: 18/316,181

(22) Filed: May 11, 2023

(65) Prior Publication Data

US 2023/0368328 A1     Nov. 16, 2023

Related U.S. Application Data

(60) Provisional application No. 63/340,470, filed on May 11, 2022.

(51) Int. Cl.
| | |
|---|---|
| *G06T 1/60* | (2006.01) |
| *G06T 1/20* | (2006.01) |
| *G06V 40/16* | (2022.01) |
| *H04N 23/65* | (2023.01) |
| *H04N 25/78* | (2023.01) |

(52) U.S. Cl.
CPC .................. *G06T 1/60* (2013.01); *G06T 1/20* (2013.01); *G06V 40/166* (2022.01); *G06V 40/172* (2022.01); *H04N 23/651* (2023.01); *H04N 25/78* (2023.01)

(58) Field of Classification Search
CPC .... H04N 23/651; H04N 25/78; H04N 23/617; H04N 25/445; H04N 23/611; G06T 1/60; G06T 1/20; G06T 1/0007; G06V 40/166; G06V 40/172; G06V 10/955; G06V 40/193; G06V 40/28
See application file for complete search history.

(56) References Cited

U.S. PATENT DOCUMENTS

| | | | |
|---|---|---|---|
| 6,646,680 B1 * | 11/2003 | Mead ................... | H04N 23/635 348/320 |
| 9,344,649 B2 | 5/2016 | Bock | |
| 9,471,153 B1 | 10/2016 | Ivanchenko | |
| 9,619,105 B1 | 4/2017 | Dal Mutto | |

(Continued)

OTHER PUBLICATIONS

U.S. Appl. No. 18/061,203, filed Dec. 2, 2022, Te-Won Lee, Entire Document.

(Continued)

*Primary Examiner* — Twyler L Haskins
*Assistant Examiner* — John H Morehead, III
(74) *Attorney, Agent, or Firm* — Wang Hardoon, P.C.

(57) ABSTRACT

Methods and apparatus for scalable processing. Conventional image sensors read image data in a sequential row-by-row manner. However, image data may be more efficiently processed at different scales. For example, computer vision processing at a first scale may be used to determine whether subsequent processing with more resolution is helpful. Various embodiments of the present disclosure readout image data according to different scales; scaled readouts may be processed using scale specific computer vision algorithms to determine next steps. In addition to scaled readouts of image data, some variants may also provide commonly used data and/or implement pre-processing steps.

20 Claims, 17 Drawing Sheets

(56) References Cited

U.S. PATENT DOCUMENTS

| | | | |
|---|---|---|---|
| 9,741,169 B1 | 8/2017 | Holz | |
| 10,366,508 B1 | 7/2019 | Liu et al. | |
| 10,390,003 B1 | 8/2019 | Liu et al. | |
| 10,410,328 B1 | 9/2019 | Liu et al. | |
| 11,611,705 B1 | 3/2023 | Chen | |
| 11,847,266 B2 | 12/2023 | Lee et al. | |
| 2004/0143380 A1 | 7/2004 | Stam et al. | |
| 2013/0106681 A1 | 5/2013 | Eskilsson et al. | |
| 2015/0049017 A1 | 2/2015 | Weber et al. | |
| 2015/0130959 A1 | 5/2015 | Kao et al. | |
| 2015/0338915 A1 | 11/2015 | Publicover et al. | |
| 2016/0267716 A1* | 9/2016 | Patel | G06F 3/013 |
| 2016/0274762 A1 | 9/2016 | Lopez et al. | |
| 2017/0142313 A1* | 5/2017 | Gren | H04N 25/78 |
| 2017/0249009 A1 | 8/2017 | Parshionikar | |
| 2018/0368074 A1 | 12/2018 | Gong et al. | |
| 2019/0050685 A1 | 2/2019 | Kaminski et al. | |
| 2019/0324529 A1 | 10/2019 | Stellmach et al. | |
| 2019/0362557 A1 | 11/2019 | Lacey et al. | |
| 2019/0363118 A1* | 11/2019 | Berkovich | H04N 25/40 |
| 2020/0169669 A1* | 5/2020 | Petkov | G06F 1/3265 |
| 2020/0382717 A1 | 12/2020 | Chiu et al. | |
| 2021/0072831 A1 | 3/2021 | Edwards | |
| 2021/0102844 A1* | 4/2021 | Chan | H04N 23/23 |
| 2021/0111207 A1* | 4/2021 | Li | H10F 39/8023 |
| 2021/0201661 A1 | 7/2021 | Jazaery et al. | |
| 2021/0248427 A1 | 8/2021 | Guo et al. | |
| 2021/0373657 A1 | 12/2021 | Connor et al. | |
| 2022/0101593 A1 | 3/2022 | Rockel et al. | |
| 2022/0326367 A1 | 10/2022 | Matuszak et al. | |
| 2022/0391697 A1 | 12/2022 | Mousavi et al. | |
| 2023/0038159 A1 | 2/2023 | Holland et al. | |
| 2023/0049339 A1 | 2/2023 | Ganguly et al. | |
| 2023/0118074 A1 | 4/2023 | Park et al. | |
| 2023/0305632 A1 | 9/2023 | Lee et al. | |
| 2023/0333384 A1 | 10/2023 | Zhu et al. | |
| 2023/0368326 A1* | 11/2023 | Lee | G06T 1/20 |
| 2023/0368328 A1 | 11/2023 | Lee et al. | |
| 2023/0370752 A1 | 11/2023 | Lee et al. | |

OTHER PUBLICATIONS

U.S. Appl. No. 18/061,226, filed Dec. 2, 2022, Te-Won Lee, Entire Document.

U.S. Appl. No. 18/061,257, filed Dec. 2, 2022, Te-Won Lee, Entire Document.

U.S. Appl. No. 18/185,362, filed Mar. 16, 2023, Edwin Chongwoo Park, Entire Document.

U.S. Appl. No. 18/185,364, filed Mar. 16, 2023, Edwin Chongwoo Park, Entire Document.

U.S. Appl. No. 18/185,366, filed Mar. 16, 2023, Edwin Chongwoo Park, Entire Document.

U.S. Appl. No. 18/316,181, filed May 11, 2023, Te-Won Lee, Entire Document.

U.S. Appl. No. 18/316,203, filed May 11, 2023, Edwin Chongwoo Park, Entire Document.

U.S. Appl. No. 18/316,206, filed May 11, 2023, Te-Won Lee, Entire Document.

U.S. Appl. No. 18/316,214, filed May 11, 2023, Te-Won Lee, Entire Document.

U.S. Appl. No. 18/316,218, filed May 11, 2023, Edwin Chongwoo Park, Entire Document.

U.S. Appl. No. 18/316,221, filed May 11, 2023, Edwin Chongwoo Park, Entire Document.

U.S. Appl. No. 18/316,225, filed May 11, 2023, Edwin Chongwoo Park, Entire Document.

U.S. Appl. No. 63/491,733, filed Mar. 22, 2023, Edwin Chongwoo Park, Entire Document.

U.S. Appl. No. 18/745,027, filed Jun. 17, 2024, SoftEye, Inc., Entire Document.

U.S. Appl. No. 18/745,233, filed Jun. 17, 2024, SoftEye, Inc., Entire Document.

U.S. Appl. No. 18/745,353, filed Jun. 17, 2024, SoftEye, Inc., Entire Document.

U.S. Appl. No. 18/745,462, filed Jun. 17, 2024, SoftEye, Inc., Entire Document.

Vaswani et al., "Attention Is All You Need," 31st Conference on Neural Information Processing Systems (NIPS 2017).

* cited by examiner

OFFSET VARIANT WITH 0 SCALE

602

1-AXIS MIRRORED VARIANT

604

2-AXIS MIRRORED VARIANT W/ OFFSET

606

700

$$C = (A_1 + A_2) - (B_1 + B_2)$$

IMAGE VALUES

| 7 | 5 | 8 | 0 | 9 | 4 | 8 | 1 |
|---|---|---|---|---|---|---|---|
| 8 | 3 | 6 | 6 | 0 | 3 | 7 | 6 |
| 0 | 1 | 1 | 9 | 8 | 1 | 2 | 0 |
| 4 | 2 | 0 | 4 | 5 | 9 | 2 | 6 |
| 5 | 5 | 8 | 7 | 5 | 7 | 3 | 4 |
| 0 | 6 | 4 | 8 | 5 | 0 | 6 | 6 |
| 8 | 9 | 9 | 0 | 5 | 6 | 6 | 7 |
| 3 | 2 | 2 | 8 | 1 | 1 | 5 | 3 |

902

904

INTEGRAL IMAGE VALUES

| 7 | 12 | 20 | 20 | 29 | 31 | 39 | 40 |
|---|----|----|----|----|----|----|----|
| 15 | 23 | 37 | 43 | 52 | 59 | 74 | 81 |
| 15 | 24 | 39 | 54 | 71 | 79 | 96 | 103 |
| 19 | 30 | 45 | 64 | 86 | 103 | 122 | 135 |
| 24 | 40 | 63 | 89 | 116 | 140 | 162 | 179 |
| 24 | 46 | 73 | 107 | 139 | 163 | 191 | 214 |
| 32 | 63 | 99 | 133 | 170 | 200 | 234 | 264 |
| 35 | 68 | 106 | 148 | 186 | 217 | 256 | 289 |

906

| 0 | 6 | 6 |
|---|---|---|
| 6 | 6 | 7 |
| 1 | 5 | 3 |

IMAGE VALUES

| | | | | | | | |
|---|---|---|---|---|---|---|---|
| 7 | 5 | 8 | 0 | 9 | 4 | 8 | 1 |
| 8 | 3 | 6 | 6 | 0 | 3 | 7 | 6 |
| 0 | 1 | 1 | 9 | 8 | 1 | 2 | 0 |
| 4 | 2 | 0 | 4 | 5 | 9 | 2 | 6 |
| 5 | 5 | 8 | 7 | 5 | 7 | 3 | 4 |
| 0 | 6 | 4 | 8 | 5 | 0 | 6 | 6 |
| 8 | 9 | 9 | 0 | 5 | 6 | 6 | 7 |
| 3 | 2 | 2 | 8 | 1 | 1 | 5 | 3 |

1002

| | | |
|---|---|---|
| 0 | 6 | 6 |
| 6 | 6 | 7 |
| 1 | 5 | 3 |

INTEGRAL IMAGE VALUES
(ONLY 8 BIT LSBs)

1004

| | | | | | | | |
|---|---|---|---|---|---|---|---|
| 7 | 12 | 20 | 20 | 29 | 31 | 39 | 40 |
| 15 | 23 | 37 | 43 | 52 | 59 | 74 | 81 |
| 15 | 24 | 39 | 54 | 71 | 79 | 96 | 103 |
| 19 | 30 | 45 | 64 | 86 | 103 | 122 | 135 |
| 24 | 40 | 63 | 89 | 116 | 140 | 162 | 179 |
| 24 | 46 | 73 | 107 | 139 | 163 | 191 | 214 |
| 32 | 63 | 99 | 133 | 170 | 200 | 234 | 8 |
| 35 | 68 | 106 | 148 | 186 | 217 | 0 | 33 |

$0 + 6 + 6 + 6 + 6 + 7 + 1 + 5 + 3 = 40$ $MOD_{256}(116 + 33) - MOD_{256}(179 + 186) =$
$MOD_{256}(149) - MOD_{256}(365) =$
$149 - 109 = 40$

FIG. 10

IMAGE VALUES @ SCALE N

| 7 | 8 | 9 | 8 |
| 0 | 1 | 8 | 2 |
| 5 | 8 | 5 | 3 |
| 8 | 9 | 5 | 6 |

1202

1212

IMAGE VALUES @ SCALE N+1

| 7 | 5 | 8 | 0 | 9 | 4 | 8 | 1 |
| 8 | 3 | 6 | 6 | 0 | 3 | 7 | 6 |
| 0 | 1 | 1 | 9 | 8 | 1 | 2 | 0 |
| 4 | 2 | 0 | 4 | 5 | 9 | 2 | 6 |
| 5 | 5 | 8 | 7 | 5 | 7 | 3 | 4 |
| 0 | 6 | 4 | 8 | 5 | 0 | 6 | 6 |
| 8 | 9 | 9 | 0 | 5 | 6 | 6 | 7 |
| 3 | 2 | 2 | 8 | 1 | 1 | 5 | 3 |

$5 + 3 + 5 + 6$
$= MOD_{256}(16 + 92) - MOD_{256}(46 + 43)$ $5 + 0 + 6 + 6 + 5 + 6 + 6 + 7 + 1 + 1 + 5 + 3$
$= MOD_{256}(89 + 33) - MOD_{256}(148 + 179)$

OVERLAPPING INTEGRAL IMAGE AT SCALE N & N+1

1206

| 7 | 12 | 15 | 20 | 24 | 31 | 32 | 40 |
| 15 | 23 | 37 | 43 | 52 | 59 | 74 | 81 |
| 7 | 24 | 16 | 54 | 33 | 79 | 43 | 103 |
| 19 | 30 | 45 | 64 | 86 | 103 | 122 | 135 |
| 12 | 40 | 29 | 89 | 51 | 140 | 64 | 179 |
| 24 | 46 | 73 | 107 | 139 | 163 | 191 | 214 |
| 20 | 63 | 46 | 133 | 73 | 206 | 92 | 8 |
| 35 | 68 | 100 | 148 | 186 | 217 | 0 | 33 |

FIG. 12

Figure 15:
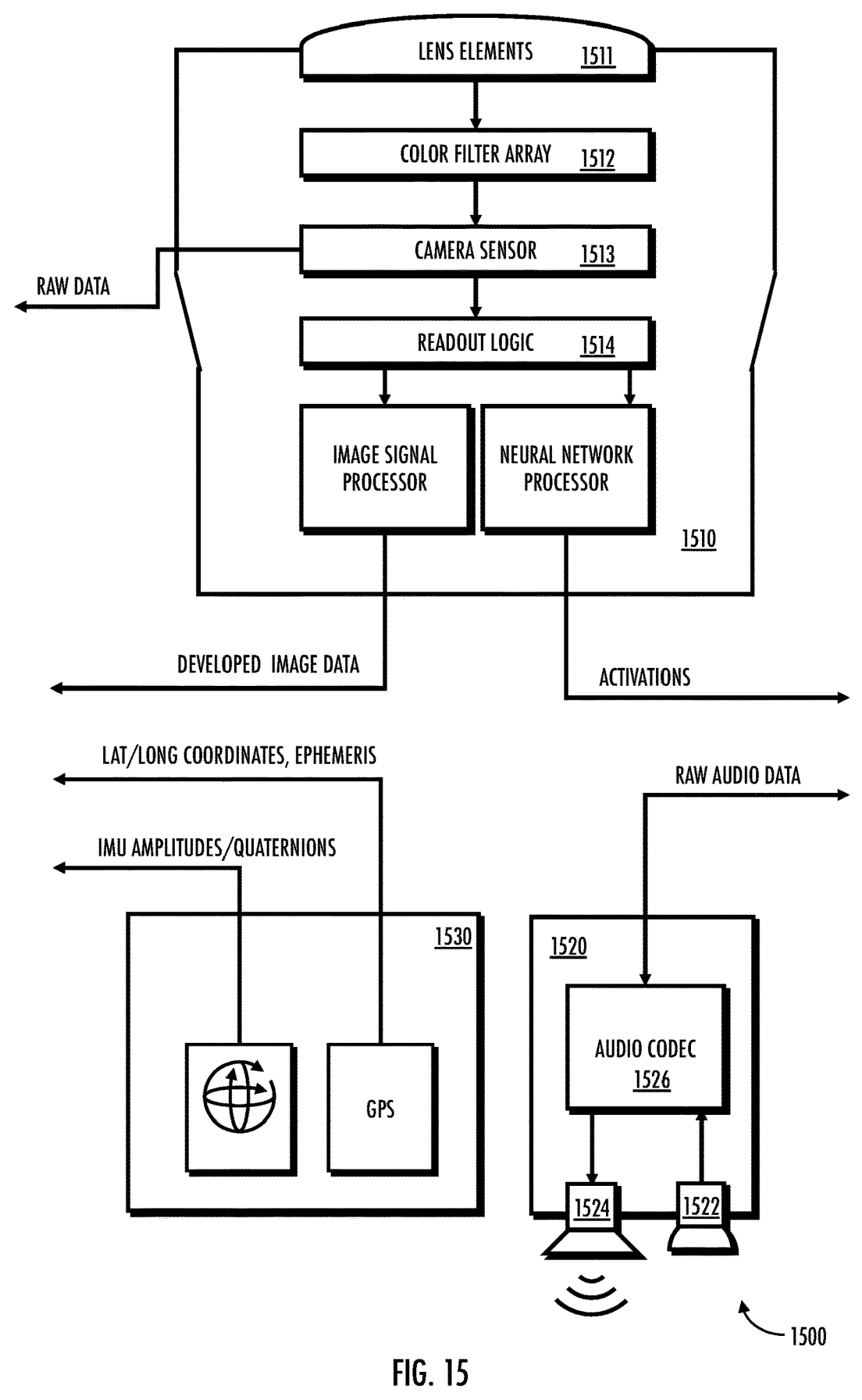

LENS ELEMENTS    1511

COLOR FILTER ARRAY    1512

CAMERA SENSOR    1513

RAW DATA

READOUT LOGIC    1514

IMAGE SIGNAL PROCESSOR

NEURAL NETWORK PROCESSOR

1510

DEVELOPED IMAGE DATA

ACTIVATIONS

LAT/LONG COORDINATES, EPHEMERIS

RAW AUDIO DATA

IMU AMPLITUDES/QUATERNIONS

1530

1520

GPS

AUDIO CODEC
1526

PHYSICAL INTERCONNECT

CAMERA SENSOR AND/OR NPU

IMAGE SIGNAL PROCESSOR

MEMORY

DETERMINE SCALE PARAMETER 1612

DETERMINE ROW/COLUMN 1614

READOUT SCALE VALUES 1616

PROVIDE SCALED READOUT 1618

MEMORY

OBTAIN SCALED READOUT 1622

PERFORM ANALYSIS AT SCALE 1624

CONTINUE/TERMINATE? 1626

METHODS AND APPARATUS FOR SCALABLE PROCESSING

PRIORITY APPLICATIONS

This application claims the benefit of priority to U.S. Provisional Patent Application Ser. No. 63/340,470 filed May 11, 2022 and entitled "SYSTEM AND METHOD FOR SCALABLE PROCESSING FOR SMARTGLASSES", each of the foregoing incorporated by reference in their entirety.

RELATED APPLICATIONS

This application is related to U.S. patent application Ser. No. 18/061,203 filed Dec. 2, 2022, and entitled "SYSTEMS, APPARATUS, AND METHODS FOR GESTURE-BASED AUGMENTED REALITY, EXTENDED REALITY", U.S. patent application Ser. No. 18/061,226 filed Dec. 2, 2022, and entitled "SYSTEMS, APPARATUS, AND METHODS FOR GESTURE-BASED AUGMENTED REALITY, EXTENDED REALITY", U.S. patent application Ser. No. 18/061,257 filed Dec. 2, 2022, and entitled "SYSTEMS, APPARATUS, AND METHODS FOR GESTURE-BASED AUGMENTED REALITY, EXTENDED REALITY", U.S. patent application Ser. No. 18/185,362 filed Mar. 16, 2023, and entitled "APPARATUS AND METHODS FOR AUGMENTING VISION WITH REGION-OF-INTEREST BASED PROCESSING", U.S. patent application Ser. No. 18/185,364 filed Mar. 16, 2023, and entitled "APPARATUS AND METHODS FOR AUGMENTING VISION WITH REGION-OF-INTEREST BASED PROCESSING", U.S. patent application Ser. No. 18/185,366 filed Mar. 16, 2023, and entitled "APPARATUS AND METHODS FOR AUGMENTING VISION WITH REGION-OF-INTEREST BASED PROCESSING", U.S. patent application Ser. No. 18/316,203 filed May 11, 2023, and entitled "APPLICATIONS FOR ANAMORPHIC LENSES", U.S. patent application Ser. No. 18/316,218 filed May 11, 2023, and entitled "APPLICATIONS FOR ANAMORPHIC LENSES", U.S. patent application Ser. No. 18/316,221 filed May 11, 2023, and entitled "APPLICATIONS FOR ANAMORPHIC LENSES", U.S. patent application Ser. No. 18/316,225 filed May 11, 2023, and entitled "APPLICATIONS FOR ANAMORPHIC LENSES", U.S. patent application Ser. No. 18/316,206 filed May 11, 2023, and entitled "METHODS AND APPARATUS FOR SCALABLE PROCESSING", and U.S. patent application Ser. No. 18/316,214 filed May 11, 2023, and entitled "METHODS AND APPARATUS FOR SCALABLE PROCESSING", each of which are incorporated herein by reference in its entirety.

In related variants, anamorphic cameras may provide unique advantages such as are more thoroughly discussed within U.S. patent application Ser. No. 18/316,203 filed May 11, 2023, and entitled "APPLICATIONS FOR ANAMOR-PHIC LENSES", U.S. patent application Ser. No. 18/316, 218 filed May 11, 2023, and entitled "APPLICATIONS FOR ANAMORPHIC LENSES", and U.S. patent application Ser. No. 18/316,221 filed May 11, 2023, and entitled "APPLI-CATIONS FOR ANAMORPHIC LENSES", previously incorporated above.

COPYRIGHT

TECHNICAL FIELD

This disclosure relates generally to the field of image sensors. More particularly, the present disclosure relates to systems, computer programs, devices, and methods that may be improved by scalable processing.

DESCRIPTION OF RELATED TECHNOLOGY

Computer vision refers to the field of artificial intelligence and computer science that enables computers to interpret and understand the visual world. Incipient research is directed toward algorithms and techniques that can extract information from digital images or videos, and then use that information to make decisions or take actions. Computer vision applications are used in a wide range of industries and fields, including healthcare, automotive, surveillance, entertainment, and robotics. Some common examples of computer vision applications include facial recognition, object detection, image segmentation, and gesture recognition.

The processing complexity of computer vision can vary greatly depending on the specific task and the complexity of the algorithm being used. For example, some simple image processing tasks, such as resizing or cropping an image, can scale linearly with the size of the image. This means that processing time increases proportionally with the size of the image. More complex computer vision tasks, such as object detection or semantic segmentation, can scale quadratically or even exponentially with the size of the input data. This is because these tasks often involve processing a two-dimensional array of pixels or regions, and the number of interactions required to process each pixel or region scales according to the total number of pixels.

BRIEF DESCRIPTION OF THE DRAWINGS

FIG. 9 is a numeric example of an integral image calculation.

FIG. 10 is a numeric example of a reduced precision integral image calculation, in accordance with various aspects of the present disclosure.

FIG. 12 is a numeric example of a cross-scale integral image calculation, in accordance with various aspects of the present disclosure.

FIG. 15 is a logical block diagram of the various sensors of the sensor subsystem, useful in conjunction with various aspects of the present disclosure.

DETAILED DESCRIPTION

In the following detailed description, reference is made to the accompanying drawings. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without departing from the spirit or scope of the present disclosure. It should be noted that any discussion regarding "one embodiment", "an embodiment", "an exemplary embodiment", and the like indicate that the embodiment described may include a particular feature, structure, or characteristic, and that such feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. The described operations may be performed in a different order than the described embodiments. Various additional operations may be performed and/or described operations may be omitted in additional embodiments.

Imaging Sensors: Accesses, Reads, Binning, and Skipping

Early display technologies (referred to as "raster-scan displays") created images by scanning a beam of electrons across the surface of a cathode ray tube (CRT). During operation, the electron beam started at the top-left corner of the screen and then scanned horizontally across each line of the display, moving from left to right, row-by-row. While modern display technologies have moved far beyond CRT displays, they inherit many of its basic assumptions.

Figure 1:
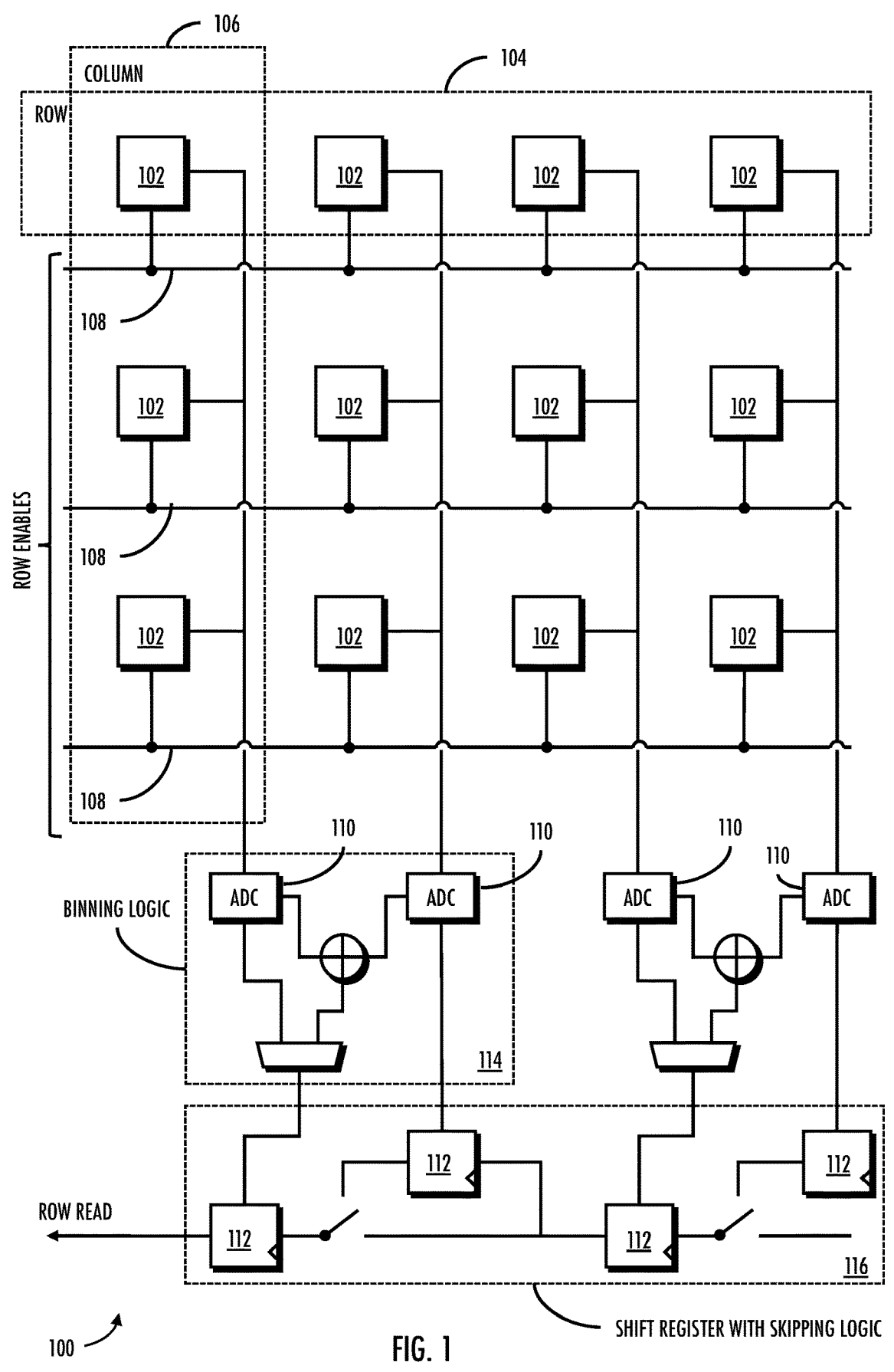
FIG. 1 is a graphical representation of an image sensor, useful to explain various aspects of camera sensor operation.

FIG. 1 illustrates a simplified image sensor 100, useful to explain various aspects of camera sensor operation. Image sensors have a two-dimensional (2D) array of light-sensitive elements called photosites 102. The 2D array is further bifurcated into rows 104 and columns 106. During an exposure, photons strike a photosite 102; this causes the photosite 102 to generate an electrical potential proportional to the light energy. The 2D array of photosites 102 is read in a raster-like process. Specifically, a row enable signal 108 is used to discharge all the photosites 102 of a particular row. The electrical potential is transferred via column read lines to analog-to-digital converters (ADCs 110). The ADCs 110 convert the electrical potential to a digital value, which are each shifted-out one at a time with an array of shift registers 112. The resulting sequential set of digital values is a row read.

Confusingly, certain terms within the sensor arts are often confused with similar terms in the computing arts. For example, a "read" might ambiguously refer to discharging the stored potential within a photosite or the resulting digital value read from the ADC. Within the context of the present disclosure, a "photosite discharge", "discharge", and their linguistic derivatives explicitly refer to the act of discharging the electrical potential stored within a photosite. Unlike digital data that may be stored, written, and read any number of times, a photosite discharge is a "destructive" analog process i.e., the discharge can only occur once for an exposure.

Referring back to FIG. 1, the simplified image sensor 100 may have the ability to "bin" reads to save time and/or power. During a binned read, multiple photosites are discharged and their corresponding digital values are summed together. For example, the illustrated binning logic 114 might discharge four (4) photosites (2 rows by 2 columns, "2×2") to create a single digital value. Artisans of ordinary skill in the related arts will readily appreciate that a variety of other binning techniques may be used with equal success. Some implementations combine the analog electrical potential (prior to ADCs 110), others sum digital values (after ADCs 110). Still other implementations may combine-and-sum (e.g., combining electrical potential for two pairs of photosites, and summing the resulting digital values, etc.). Regardless of the specific implementation details, binning technologies enable cameras to capture high resolution images in full-light, while also emulating a much larger photosite (with less granularity) using the same sensor in low light.

"Skipping" reads are a related technology. During a skipping read, only a subset of the shift registers is used. For example, the illustrated skipping logic 116 might only enable every other shift register 112 (every other column is skipped). In effect, this cuts the total number of values in half (or down to a quarter when used in combination with every other row enable 108).

Existing Computer Vision Processing at Different Image Sizes

Switching now to a separate field of arts, so-called "Big O notation" is commonly used in computer science to describe the time and/or space requirements of an algorithm as a function of the input. For example, an algorithm that grows linearly as a function of input size is described as O(N); in contrast, a function that grows quadratically would be described as $O(N^2)$. Other common examples of Big O notation include O(1) for constant time complexity, O(log N) for logarithmic time complexity, and $O(2^N)$ for exponential time complexity.

The computational complexity of image processing algorithms can vary depending on the specific algorithm being used and the size of the image being processed. Some image processing operations (e.g., convolution, filtering, etc.) have a computational complexity that scales linearly with the size of the image. Other operations, such as certain types of feature extraction and object detection/recognition algorithms, may have a higher computational complexity that can scale quadratically $(O(N^2))$ or even higher (e.g., $O(2^N)$, etc.).

Figure 2:
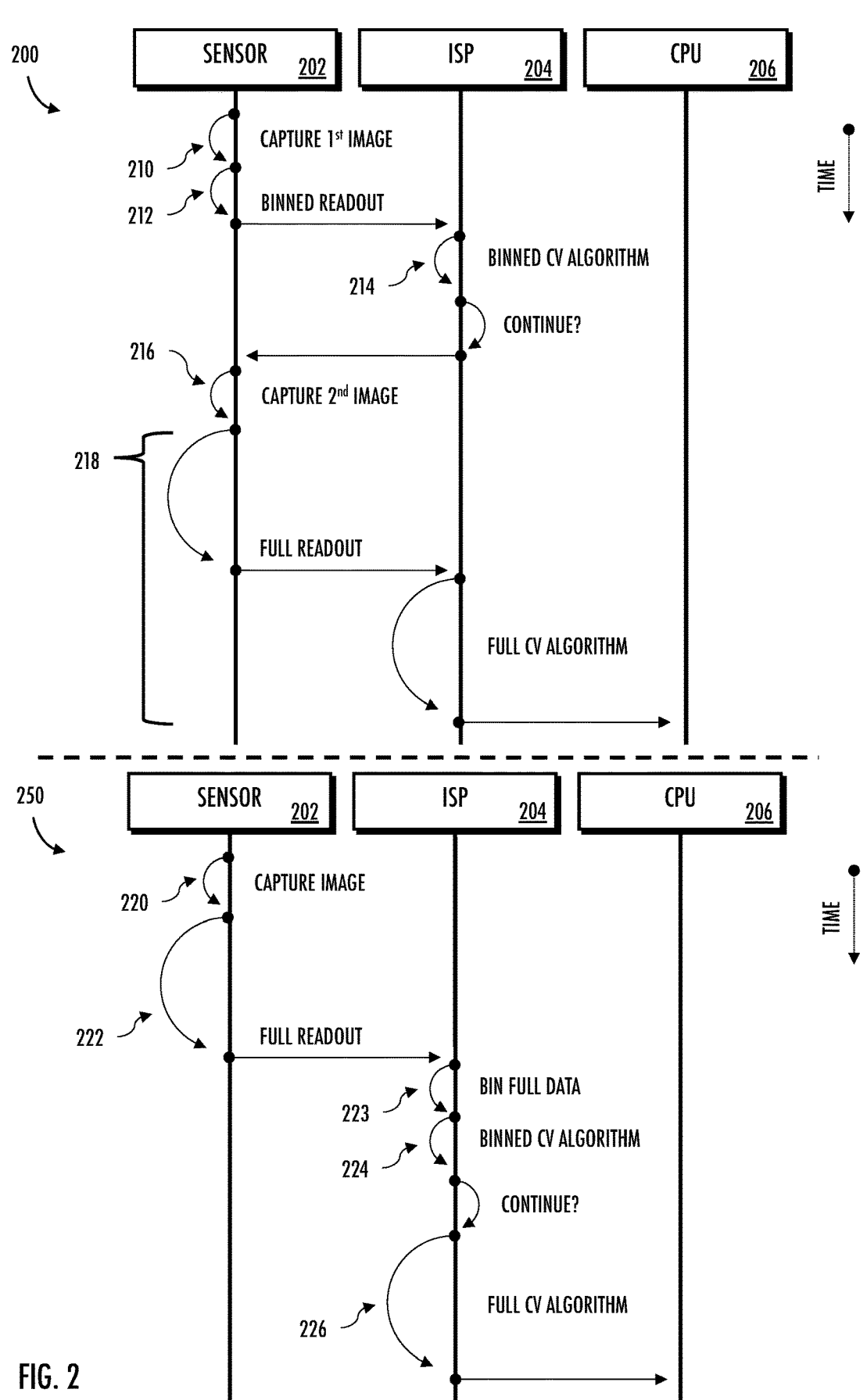
FIG. 2 depicts logical ladder diagrams of two conventional techniques for performing preliminary computer vision analysis.

To avoid unnecessary processing at full resolution, many devices perform a preliminary analysis on a reduced resolution to determine whether to proceed with the full computer vision analysis. If the preliminary analysis is successful, then full analysis is performed. If the preliminary analysis is unsuccessful, full analysis can be skipped. FIG. 2 presents logical ladder diagrams of two conventional techniques for performing preliminary computer vision analysis.

The first ladder diagram 200 depicts a "re-capture" scenario. As shown, a camera sensor 202 captures a first image (step 210) and performs a binned sensor readout to minimize the transfer size of the initial image data (step 212). The image signal processor (ISP 204) performs an initial binned computer vision algorithm (step 214). If the initial binned result is successful, then the ISP 204 instructs the camera sensor 202 to re-capture a second image (step 216). The full second image is readout for full computer vision analysis (step 218)—the results may then be provided to the central processing unit (CPU 206). Of particular note, a second image must be captured because the "destructive" nature of the photosite discharge during the binning read prevents the camera sensor 202 from re-using the electrical potential for a non-binned resolution of the first image data. Unfortunately, the first image capture and the second image capture occur at different times and may be substantially different; the subject and/or camera sensor 202 may have moved, exposure settings may change, etc.

The second ladder diagram 250 depicts a "single capture" scenario. As shown, a camera sensor 202 captures an image (step 220) and performs a full sensor readout of the initial image data (step 222)—this upfront transfer cost ensures that the ISP 204 has a complete version of the full non-binned image. As an additional step, the ISP 204 bins the image data (step 223); once binned, the ISP 204 can perform an initial binned computer vision algorithm (step 224). If the initial binned result is successful, then the ISP 204 performs the full computer vision analysis (step 226) and provides its results to the CPU 206. While this technique does not require re-capture, the transfer time greatly increases, and binning at the ISP 204 is performed digitally with multiply-accumulate logic (rather than the much more power efficient camera sensor ADC).

Scalable Processing in Smart Glasses

Recently, "smart glasses" have garnered significant consumer interest. Smart glasses attempt to incorporate computer vision processing capabilities in an eyeglass form factor; for example, most implementations of smart glasses use cameras to capture images of the external world, and a heads-up display to provide information to the user. Unfortunately, the available battery power and dynamically shifting loads prevent smart glasses from continuously performing computer vision processing at full resolution. While the need for better solutions is most apparent for smart glasses, artisans of ordinary skill in the related arts will readily appreciate that computer vision complexity has always presented significant challenges for mobile and embedded devices including e.g., smart phones, laptops, smart watches, etc.

Conceptually, existing techniques for computer vision processing have been researched and developed around images as data structures. However, in practical operation, the image processing pipeline (e.g., camera sensor, image signal processor, etc.) introduces multiple constraints that affect when image data is valid and how image data is presented. For example, the sequential row-by-row readout mechanisms that have been preserved from raster-scan displays is neither necessary nor particularly important for modern display technologies. Various embodiments of the present disclosure order/re-order sensor data to improve computer vision processing. As elaborated in greater detail below, computer vision algorithms may be greatly accelerated by processing image data out-of-sequence.

Example Operation, Scale-Based Sensor Readout

Figure 3:
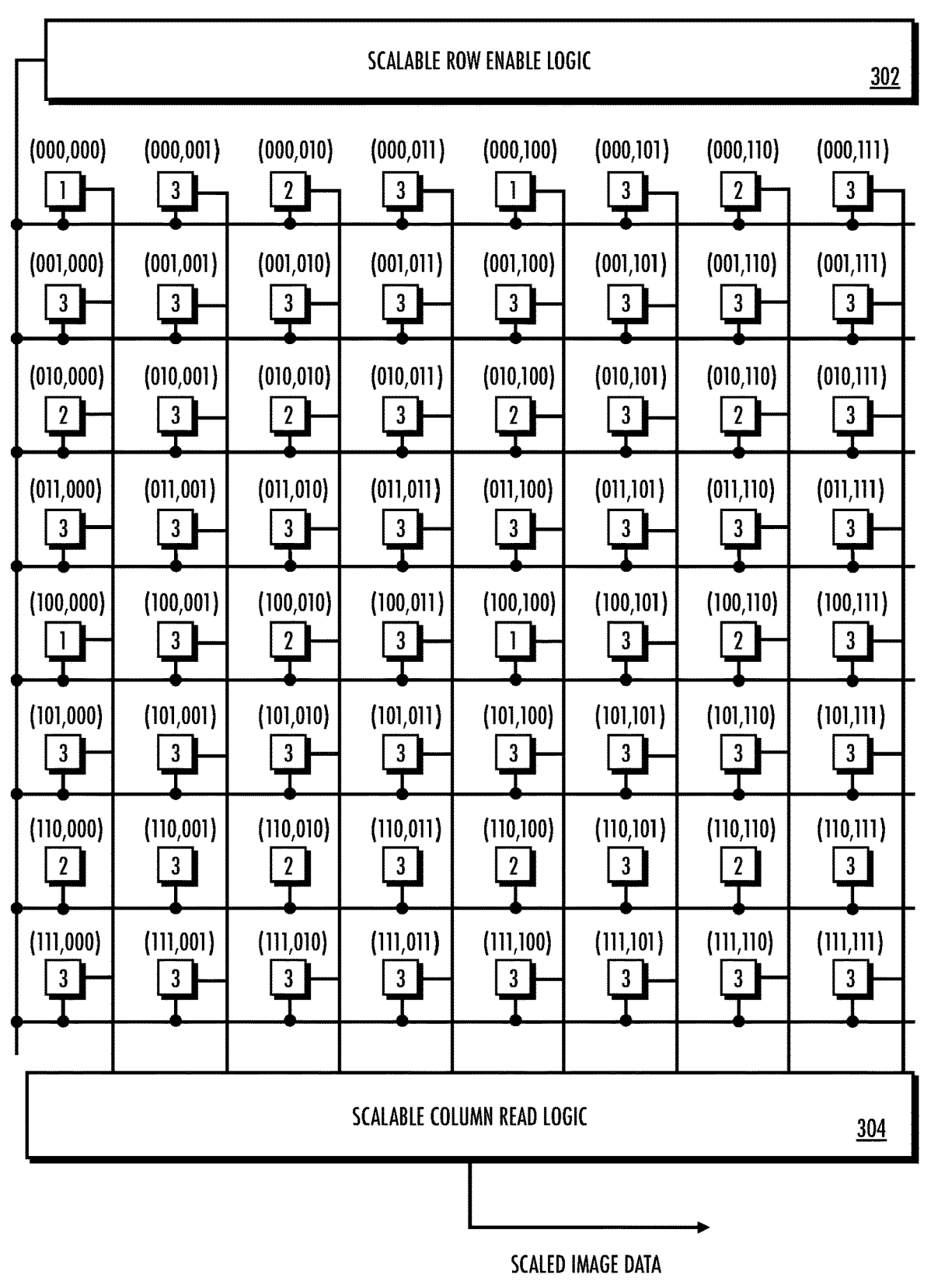
FIG. 3 illustrates one exemplary implementation of a scale-based sensor, in accordance with various aspects of the present disclosure.

FIG. 3 illustrates one exemplary implementation of a scale-based sensor 300. The scale-based sensor 300 includes a two-dimensional array of photosites that are coupled to row enables and column read lines. The row enables are driven by the scalable row enable logic 302; the column read lines are read by scalable column read logic 304. Instead of enabling rows sequentially row-by-row, the scalable row enable logic 302 enables rows according to a scale parameter. Similarly, instead of reading columns sequentially (or sequentially binned, sequentially skipped) to generate a row read, the scalable column read logic 304 reads the columns based on the scale parameter.

As a brief aside, each photosite depicted within FIG. 3 includes a corresponding row and column index denoted by a coordinate pair e.g., (row index, column index). For example, the uppermost-leftmost photosite is at coordinate (0b000, 0b000), the uppermost-rightmost photosite is at coordinate (0b000, 0b111), the lowermost-leftmost photosite is at coordinate (0b111, 0b000), etc. The illustrated array is represented with 64 photosites arranged in eight (8) rows of eight (8). Artisans of ordinary skill in the related arts will readily appreciate that the 64-photosite example is greatly simplified for ease of explanation—most cameras have millions of photosites.

In one exemplary embodiment, the scalable row enable logic 302 uses a scale factor and bit-reversed addressing to determine the row to enable. Similarly, the scalable column read logic 304 uses the scale factor and bit-reversed addressing to determine the column to read from. In one specific implementation, the scale factor is based on binary division of the smallest dimension. Here, the rows and columns are both eight (8) elements in size; this corresponds to three (3) binary scales: 2 elements at scale 1 ($2^1$=2), 4 elements at scale 2 ($2^2$=4), and 8 elements at scale 3 ($2^3$=8). An asymmetric array of 16×8 would also have three scales (at scale 1, the array would be 4×2), etc. In bit-reversed addressing, the binary representation of the index or address of each data element is reversed, such that the least significant bit becomes the most significant bit, and vice versa. For example, the normal (natural) sequence 0, 1, 2, 3, 4, 5, 6, 7 has a binary representation of: 000, 001, 010, 011, 100, 101, 110, 111. In bit-reversed ordering, the binary representation would be 000, 100, 010, 110, 001, 101, 011, 111. This corresponds to the ordered sequence: 0, 4, 2, 6, 1, 5, 3, 7.

During the first scale factor readout, the scalable row enable logic 302 enables the rows according to bit-reversed addressing for 1 bit at scale 1. The scalable column read logic 304 reads according to bit-reversed addressing at scale 1. In other words, the first four (4) values are: location (0,0) which corresponds to (000, 000), (0, 1) which corresponds to (000, 100), (1, 0) which corresponds to (100, 000), and (1, 1) which corresponds to (100, 100). When necessary (as further discussed below), the second scale factor is readout. Here, location (00,01) corresponds to (000, 010), (00, 11) corresponds to (000, 110), (01, 00) corresponds to (010, 000), (01, 01) corresponds to (010, 010), (01, 10) corresponds to (010, 100), (01, 1) corresponds to (010, 110), etc. When necessary, the third scale factor may be readout to provide the complete image data. Artisans of ordinary skill in the related arts will readily appreciate that the scale factor readouts may be extended to arrays of any size, the depicted embodiment being purely illustrative.

Figure 4:
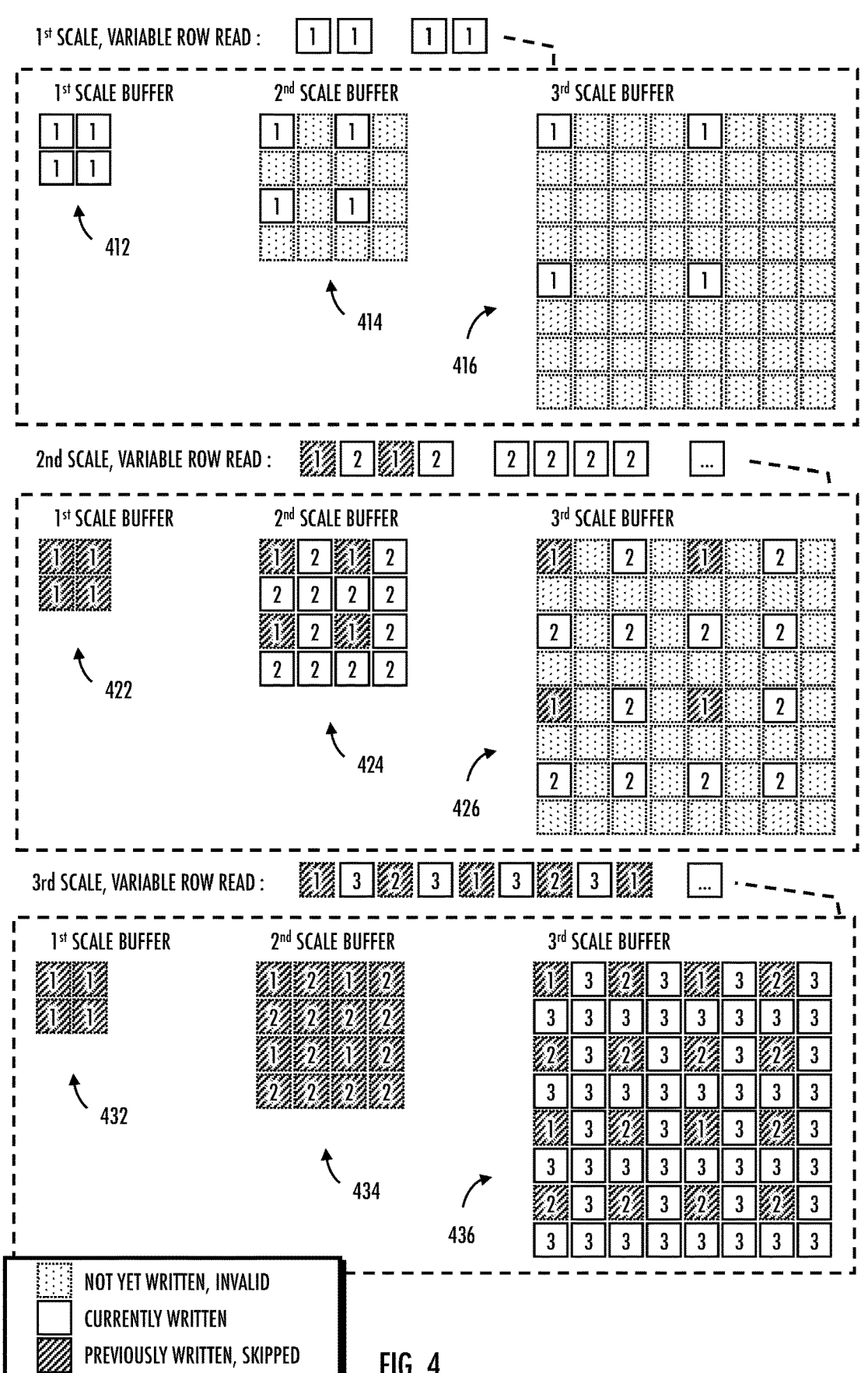
FIG. 4 illustrates the contents of memory buffers corresponding to each scale factor readout, in accordance with various aspects of the present disclosure.

In one exemplary embodiment, the scale factors may be readout into one or more memory buffers. The memory buffers may be present on the sensor itself, an image signal processor or other processing logic, or as part of system memory. FIG. 4 illustrates the contents of three (3) memory buffers corresponding to each scale factor readout. Once filled with valid data, the memory buffers may be used for processing at specific scale factors. In other words, the first scale factor memory buffer may be used for preliminary processing, while the second and third memory buffers are being filled, etc.

As shown, the first scale factor readout includes four values which are written into locations (0,0), (0,1), (1,0) and (1,1) of the first scale memory buffer 412; copies are also written into locations (00,00), (00,10), (10,00) and (10,10) of the second scale memory buffer 414 and (000,000), (000,100), (100,000) and (100,100) of the third scale memory buffer 416. Unwritten values are skipped or otherwise treated as invalid, e.g., they may be filled with null data or otherwise ignored. Once the first scale memory buffer 412 has been completely written, its contents may be immediately used for processing at the first image scale (discussed in greater detail below).

In some variants, row reads may be implemented with variable length row reads. Variable length row reads may skip previously written values. For example, the second scale factor readout includes 16 values, of which only 12 values need to be written to the second scale memory buffer 424. Specifically, locations (00,00), (00, 10), (10, 00) and (10, 10) were previously written and may be skipped. As previously mentioned, copies of the second scale factor readout may also be written into locations of the third scale memory buffer 426. The first scale buffer 422 may be entirely skipped.

Finally, the third scale factor readout includes 64 values, of which only 48 values need to be written to the third scale memory buffer 436. The first scale buffer 432 and second scale buffer 434 were previously written and may be entirely skipped.

While the illustrated example shows variable length row reads, fixed length row reads (not shown) may be substituted with equal success. Fixed length row reads may use a length determined by the scale factor. Thus, the second scale factor readout would have row reads that are 4 values in size; the third scale factor readout would have row reads that are 8 values in size, etc. Still other variants may use a fixed size read that is consistent across all scales i.e., reads may be provided in "sets" of 2, 4, 8, etc. In such implementations, the second scale factor readout might be provided as six (6) or eight (8) "pairs" of two, the third scale factor readout might be provided as 32 or 24 "pairs", etc.

Fixed length row reads may be preferable to minimize sensor complexity, however the memory buffer logic may need additional logic to ignore the duplicate reads (e.g., the second scale factor readout includes values which correspond to the first scale factor readout, etc.). Alternatively, the copying step may be performed at the end of a data transfer. As but one such example, the first scale factor readout may write to the locations (0,0), (0,1), (1, 0), and (1,1). The second scale factor readout includes 16 values, of which 4 values have been previously discharged: (00,00), (00, 10), (10, 00) and (10, 10). After 16 values have been written these 4 locations may be written over, using the copy from the first scale factor readout. In other words, the previously read scale memory buffer may be used to correct incorrect reads. While this adds an additional copy step after each scale factor readout, this delay may be useful where neither the camera sensor nor the memory buffer logic can skip/ignore values.

Additionally, while the foregoing solution uses distinct memory buffers to reduce memory management overhead, a single buffer may be substituted with equal success for implementations with memory management systems that enable concurrent access. In these implementations, the array values may be written into a single data structure with appropriate spacing. During subsequent read/write activity, only values for lower scales are read for processing and only the values that have not previously been written for the higher scales are being written to. In other words, while concurrent access may add significant data structure overhead, the array locations themselves are not subject to read/write hazards (i.e., read while being written to).

Figure 5:
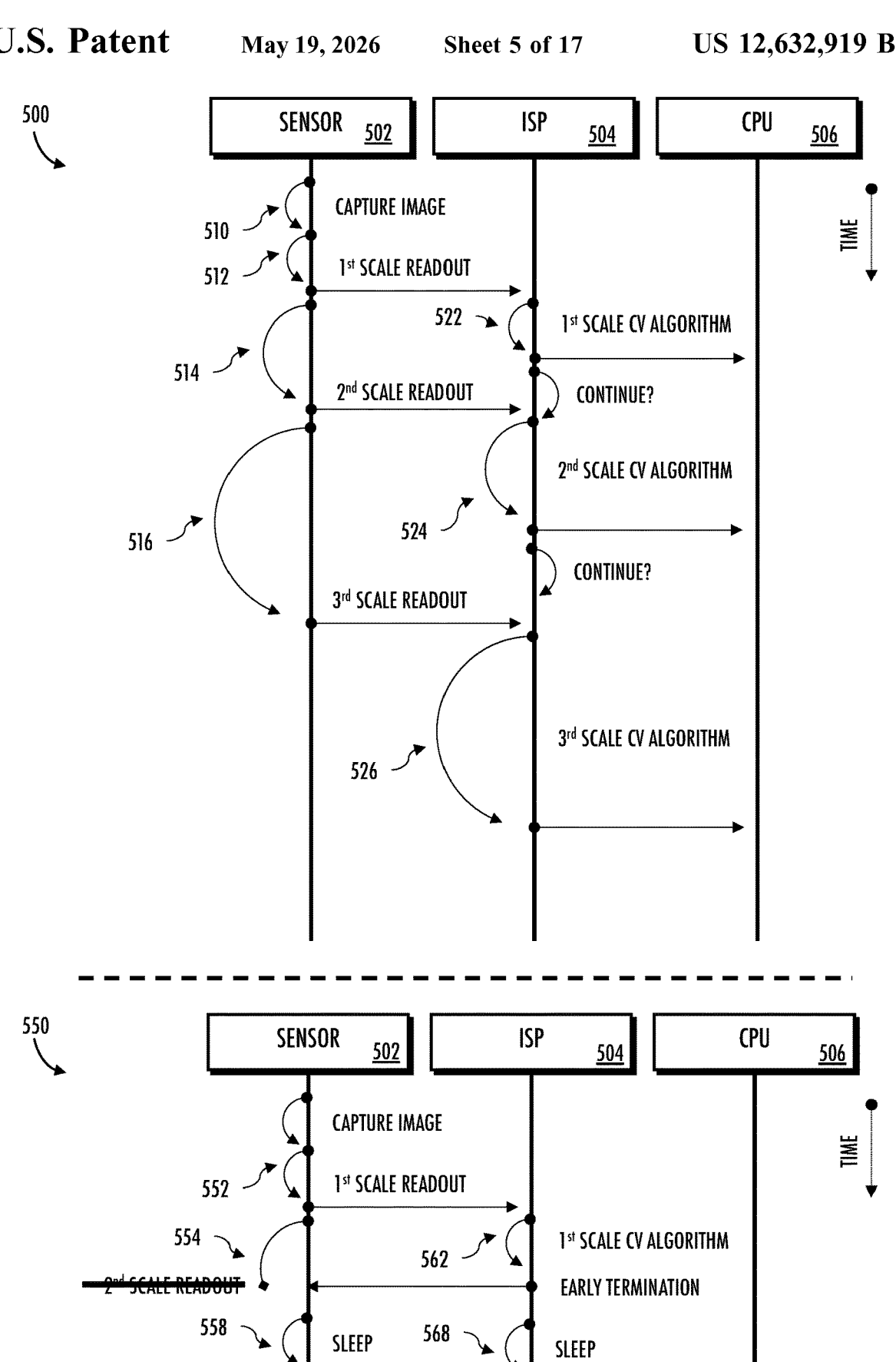
FIG. 5. depicts logical ladder diagrams of scale specific processing for a full analysis scenario and an early termination scenario, in accordance with various aspects of the present disclosure.

As previously alluded to, the individual memory buffers may be used for processing at specific scale factors. Since the memory buffers are concurrently filled but completed at different times, preliminary processing can start earlier and trigger early termination (if necessary). Referring now to FIG. 5. logical ladder diagrams of scale specific processing depict both a full analysis scenario 500 and an early termination scenario 550.

In the "full analysis" scenario 500, a camera sensor 502 captures a first image (step 510) and starts its sensor readout. The sensor readout begins at the first scale factor (step 512) and (if uninterrupted) continues onto the second scale factor (step 514) and the third scale factor (step 516), etc. until the full image data has been readout. As previously noted, the first scale factor readout is transferred to a first memory buffer and also may be copied into the corresponding locations of the second and third memory buffers (as discussed above).

As soon as the first memory buffer is available, it may be used by the image signal processor (ISP 504) to perform a preliminary computer vision analysis at the first scale (step 522). If successful, then the results may be provided to the central processing unit (CPU 506). Similarly, the ISP 504 may process additional computer vision analysis at the second scale (step 524) and third scales (step 526), etc. reporting results at each scale.

As a brief aside, different scales of computer vision analysis may provide different functionality and/or types of information, etc. For example, a first scale of computer vision analysis might perform facial detection whereas a second scale might implement facial recognition (from a library of faces, etc.). "Facial detection" and "facial recognition" are two related but distinct technologies that involve analyzing images or video footage of faces. Facial detection refers to the process of identifying the presence of a face in an image or video. It involves detecting the location, size, and orientation of a face within an image or video frame, and it can be used for a variety of purposes such as focusing a camera on a person's face, tracking the movement of a person's face, or detecting whether a person is looking at a screen. Facial recognition, on the other hand, involves identifying a specific individual from a database or set of images by comparing their facial features to those of other individuals. It typically involves using algorithms to analyze various characteristics of a face, such as the distance between the eyes, the shape of the nose and mouth, and the contours of the face, to create a unique "faceprint" that can be compared against a database of known faces.

As a practical matter, these machine learning techniques have different goals, design trade-offs, and applications. For example, the error rates (either false positive/false negatives) in facial detection and facial recognition can vary depending on a variety of factors, including the quality of the technology, the environment in which it is being used, and the specific application of the technology. In general, error rates in facial detection (~1-2%) tend to be far less common than facial recognition (10-20%), for similar processing complexity and/or power consumption. While the foregoing discussion describes a facial detection/facial recognition application, artisans of ordinary skill in the related arts will readily appreciate that similar considerations broadly apply to object detection/recognition, text (character) detection/recognition, and/or other similar computer vision applications.

Referring back to FIG. 5, the ISP 504 may also trigger early termination at any point. As shown in the "early termination" scenario 550, a camera sensor 502 captures a first image and starts its sensor readout. The sensor readout begins at the first scale factor (step 552) and provides the first scale factor readout to the ISP 504. In this case however, the ISP 504 performs the preliminary computer vision analysis at the first scale (step 562) and determines that further processing of the image is unnecessary. The ISP 504 triggers an early termination that interrupts the second scale factor readout (step 554). In some variants, the sensor 502 and/or ISP 504 may additionally go to sleep to save power (step 558 and step 568).

The exemplary scale-based sensor readout provides multiple benefits over conventional sequential row-by-row readouts. As previously alluded to, most computer vision processing algorithms are designed to accept complete data structures; this requires sequential row-by-row readouts to complete a full, binned, or skipped readout prior to delivery. In contrast, the exemplary scale-based sensor readouts can provide completed reduced resolution scale readouts without interrupting ongoing scale readouts. This allows scale specific processing to occur in parallel with ongoing scale readouts; for example, the computer vision analysis at the first scale (step 522) can be initiated as soon as the first scale readout has completed (step 512). More directly, the computer vision analysis at the first scale (step 522) occurs in parallel with the second scale readout (step 514). This reduces overall latency, provides faster time-to-inference, and allows for earlier termination.

Additionally, the destructive nature of photosite discharges can only be used once for a capture. In other words, a photosite can be discharged for a non-binned read or a binned read, but not both. Conventional solutions must either perform multiple captures or transfer the full capture and digitally emulate the binning process. In contrast, the exemplary embodiments use a scale-based sensor readout that skips previously read photosites (at the sensor) and/or previously written values (at the memory buffer logic). Using a single capture ensures that the image data at each scale is consistent (i.e., the differences were not introduced from camera or subject movement and/or exposure differences). Furthermore, copying data into different memory buffers consumes far less power than digital binning (which requires the additional steps of arithmetic before storing to memory).

While the illustrated example is presented with a memory buffer for each scale factor, any number of memory buffers may be implemented with equal success. In fact, while the foregoing discussion is presented in the context of static memory buffers, the concepts may be broadly applied to dynamic memory buffers which are allocated according to application specific considerations. For example, if image scale processing only occurs at two scale factors (e.g., scale factor 2 and 3), then only two memory buffers may be necessary. Similarly, if image scale processing occurs at four scale factors (e.g., scale factor 0, 1, 2, 3) then four memory buffers may be allocated for use.

Notable Substitutions: Offsets, Mirroring, and Partial Readout

Figure 6:
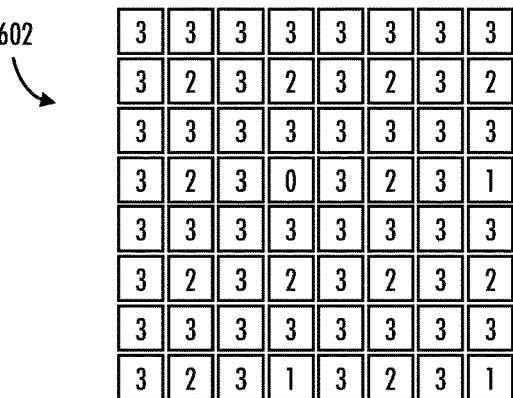
FIG. 6 presents a variety of different addressing schemes which have different characteristics, useful with embodiments of the present disclosure.
Figure 6:
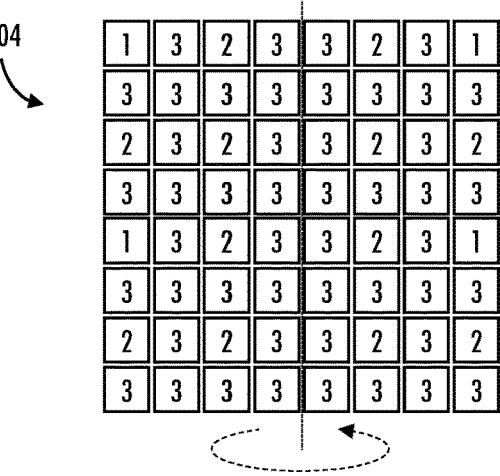
Figure 6:
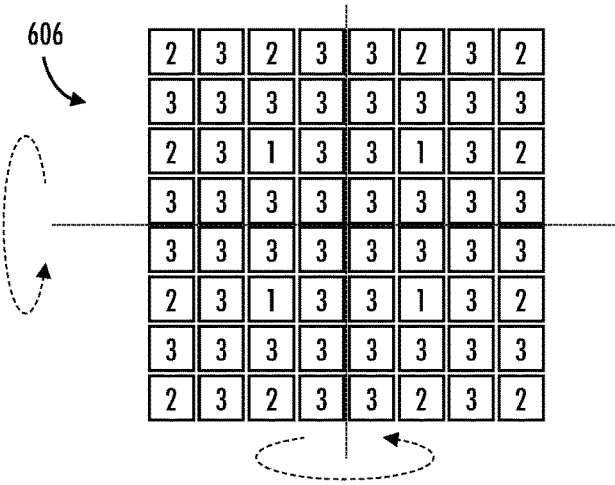

While the foregoing discussion is presented in the context of a scale-based sensor that uses bit-reversed addressing, a variety of different addressing schemes may be substituted with equal success. Different scales of an image may be used for different functionalities and/or types of information (e.g., object detection at a first scale, object recognition at another scale, etc.). Thus, certain addressing schemes may provide desirable traits for certain types of processing. FIG. 6 presents a variety of different addressing schemes which have different characteristics.

As a brief aside, bit-reversed addressing may have a positional bias at lower scales. For example, the first location of the first scale is at the uppermost-left corner of the image data (0,0) whereas the fourth (and last) location of the first scale is at the center of the image data (1,1). As a result, the first scale has an upper-left bias. While the bias is progressively smaller at higher scales, some applications may be better served with centered pixels at lower scales.

In some variants, the addressing scheme may include a row and/or column offset to adjust the positioning of the lower scales. For example, as shown in the first addressing scheme 602, a row and column offset is used to center the image information at the $0^{th}$ scale (e.g., $2^0=1$). More generally, the techniques may be used to adjust the bias for any specific scale. In fact, different scales may have different offsets. As but one such example, a first scale may be used for object detection which generally occurs in one area of an image (e.g., the center) and a second scale may be used for gesture recognition which generally occurs in a different area of an image (e.g., the lower corners). The different scales may be biased accordingly within the scalable row enable logic and scalable column read logic.

Some computer vision applications may benefit from symmetry across one or more axis. The second addressing scheme 604 provides horizontal symmetry across a vertical median. This may be particularly useful for applications which involve left-right symmetry (e.g., gesture recognition). Similarly, a third addressing scheme 606 provides horizontal and vertical symmetry across a vertical median and a horizontal equator. This may be useful for applications that trend toward the center but may have intermittent deviations (e.g., gaze point tracking).

More generally, the addressing scheme (skipping pattern) and clustering does not need to be consistent across different scales. In other words, so long as the output ordering and skip/ignore duplicate logic is consistent between the sensor and the memory buffer logic, the specific manner by which addressing occurs is not important. Additionally, while the foregoing examples provide the full image resolution at the highest scales, some embodiments may only be interested in a portion of the image at higher scales. Thus, some implementations may read out the lower scales but only read out a half, sector, quadrant, octant of the full resolution at higher scales.

Notable Optimization Using Inertial Measurement Data

The exemplary techniques discussed above use scalable row enable and scalable column read logic to implement readout sequencing at different scales. However, other variants may consider other factors in addition to scalable processing tasks.

As a brief aside, many computer vision techniques (e.g., neural network processing and machine learning models) are trained on libraries of image data. Typically, these images are in a "level" orientation—i.e., the horizon line is horizontal. One possible solution is to train the computer vision models to correct for tilt, this adds to model complexity and/or runtime power consumption. Other solutions use ISP pre-processing to level the image prior to computer vision analysis; ISP pre-processing adds pipeline delay and increases the overall system power consumption.

Figure 7:
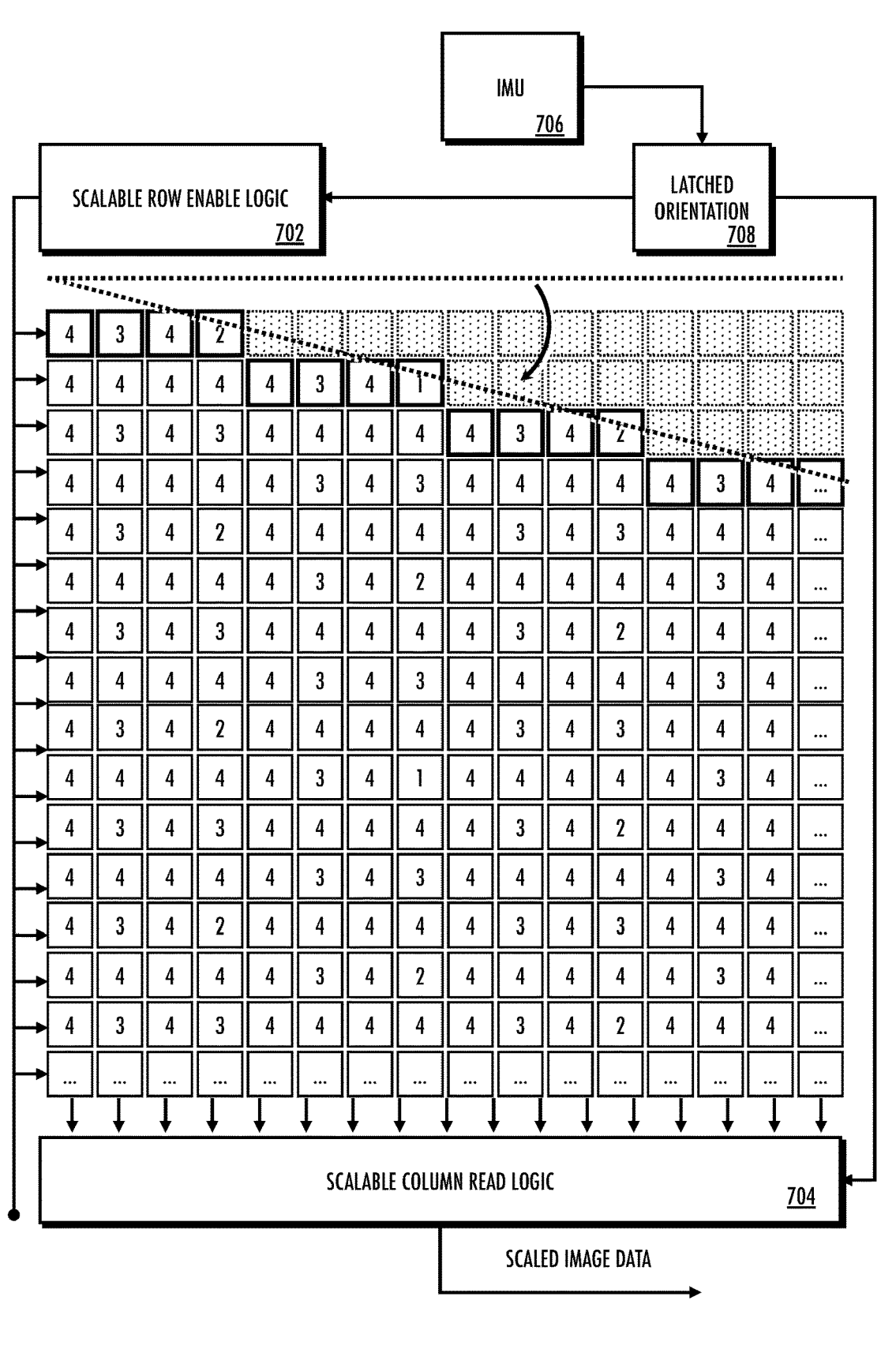
FIG. 7 illustrates one exemplary implementation of a scale-based sensor that incorporates inertial measurement data, in accordance with various aspects of the present disclosure.

Consider the system 700 depicted within FIG. 7, where an exemplary scalable row enable logic 702 and scalable column read logic 704 receive latched orientation information 708 from an inertial measurement unit (706). In this example, the readout sequencing may be "pre-oriented" before being transmitted from the camera sensor. Of particular note, most IMUs provide motion as a quaternion (i.e., a vector describing relative motion of an object in four-dimensional (4D) space). While the illustrated example is presented as a tilt for ease of illustration, artisans of ordinary skill in the related art will readily appreciate that practical implementations will map the 4D vector to a 2D vertical and/or horizontal keystone adjustment with some degree of tilt.

During an exposure, the IMU 706 measures the camera orientation. In some cases, the IMU 706 may additionally filter the orientation information to compensate for e.g., instrumentation noise, etc. The resulting quaternion defines the camera's offset from level and is latched as a ratio (or slope) of change in rows per change in columns; in some variants, some amount of horizontal and/or vertical magnification/minification may also be latched (also referred to as keystone distortion). Later, during the readout process, the slope and/or keystone adjustment modifies the row enable for the current column being read. The resulting set of values are written to a memory buffer at zero slope. In other words, the camera sensor writes level-corrected image data to the memory buffer, which may then be used for downstream computer vision processing "as-is".

For example, as shown in FIG. 7, the latched orientation corresponds to an adjustment of one row, across every four columns. In this example, the scalable readout is additionally offset by 8 columns, thus the (0,0) position of the first scale readout corresponds to the $8^{th}$ column. The scalable row enable logic 702 adjusts the column offset by 1, the scalable column read logic 704 reads this position as the level-corrected (0,0) coordinate.

While the foregoing example is presented in the context of IMU-based image corrections, artisans of ordinary skill in the related arts will readily appreciate that these concepts can be broadly extended to a variety of image data manipulations (e.g., cropping, shrinking, stretching, rotation, and/or other image manipulations) that may be performed at the image sensor based on preconfigured parameters and/or sensed environmental changes. For example, a camera sensor may be set to implement optical zoom-in/zoom-out; handling this in the camera sensor with the readout sequence reduces the data transfer size and obviates optical zoom at the ISP. As another example, a camera sensor may be "centered" on a point in space using e.g., gaze point information or other user input. Cropping to a region-of-interest in the camera sensor reduces unnecessary data transfers and may reduce downstream computer vision-based cropping.

Example Operation, Integral Images and Scale Specific Statistics and Data

Figure 8:
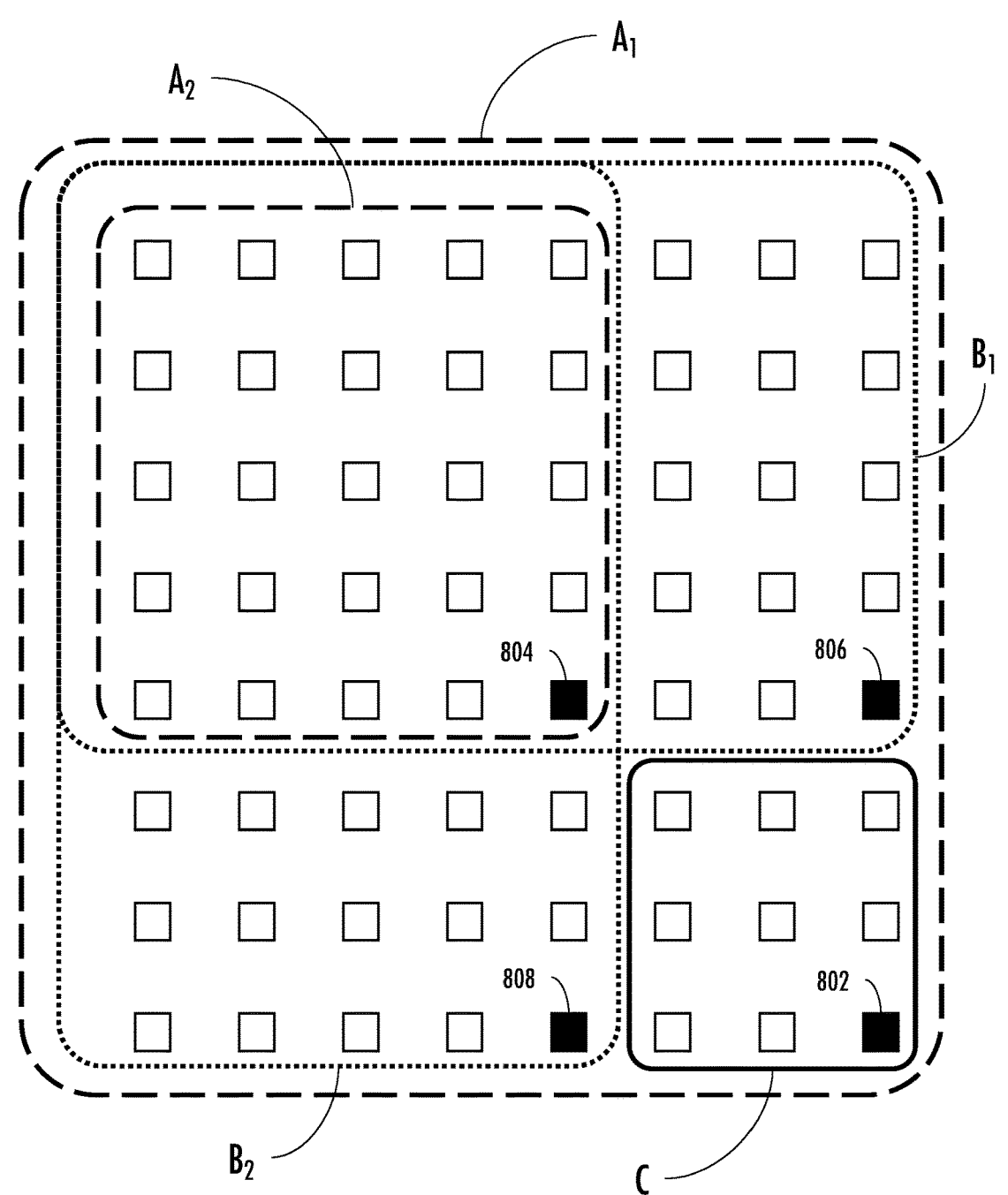
FIG. 8 is a symbolic representation of an integral image calculation.

As brief tangent, so-called "integral images" also known as "summed area tables" are a data structure used in computer vision and image processing to efficiently compute the sum of pixel intensities over rectangular regions in an image. FIG. 8 provides a symbolic representation of an integral image calculation. As shown, the integral image data structure is created by summing each value in the original image with the sum of all the pixels above and to the left of it, including itself. This process is done in a cumulative way, so that the value of each location in the integral image represents the sum of all the values in the rectangle from the upper left corner of the original image to that location. Thus, for example, the value at location 802 is the sum of all the values of $A_1$; the value at location 804 is the sum of all the values of $A_2$; the value at location 806 is the sum of all the values of $B_1$; the value at location 808 is the sum of all the values of $B_2$.

Once calculated, the integral image data structure allows the sum of any patch of data to be quickly calculated with only 3 operations (a difference of two sums). For example, as shown, the sum of patch C is given according to the following equation:

$$C = (A_1 + A_2) - (B_1 + B_2) \qquad\qquad \text{EQN:}$$

As but one such example, FIG. 9 provides a sample array of values 902, and its corresponding integral image data values 904. As shown, the sums of a 3×3 patch 906 may be directly calculated by performing 9 consecutive sums of the values, or 2 sums and a difference using the integral image data values 904.

Once an integral image is constructed, it can be used to quickly compute the sum of values over any rectangular region in the original image, using just four values from the integral image. This is much faster than computing the sum directly from the original image by iterating over all the values in the region. As a result, integral images are used in many computer vision and image processing algorithms (e.g., face detection, object recognition, and motion detection, etc.) to efficiently compute features over image regions.

Unfortunately, memory footprint is a significant limitation of integral images. This has not been a significant issue for most computer vision processing, since most algorithms are run on 32-bit (or higher) compute platforms. However, image sensors and embedded devices (generally) have an upper limit that is constrained by fixed point arithmetic. For example, a megapixel of image data using 12-bit values quickly exceeds 16-bits of precision.

Various embodiments of the present disclosure calculate a reduced precision integral image using only the least significant bits (LSBs). FIG. 10 depicts a sample array of values 1002, and its corresponding 8-bit LSBs of integral image data values 1004. The LSB based arithmetic accurately represents the sum of small patches of data using modulo arithmetic ($2^8=256$), since the carried overflow is zeroed out. While the illustrated example is presented with 8-bits for ease of explanation, most practical implementations would use a 12-bit ($2^{12}=4096$) or 16-bit ($2^{16}=65,536$) LSB integral image. Any number of LSBs might be used, subject to patch size constraints.

Conceptually, the upper limit that can be represented by the fixed precision of the LSBs places a limitation on the size of the patch that can be calculated. While the limitation on patch size would likely be too small for a full resolution image (multiple megapixels), the scale-based images described throughout are at much smaller resolutions. For example, a 12-bit LSB reduced precision integral image using 8-bit image values may easily accommodate patches that are 8×8, which is sufficient for face detection applications, etc. Furthermore, lower scale computer vision processing is part of the preliminary computer vision analysis to determine whether to proceed with the full computer vision analysis—generally, these stages do not require full precision anyway. Thus, calculating the integral image at the sensor further offloads processing load and may reduce downstream computer vision processing burden and/or improve time-to-inference.

Figure 11:
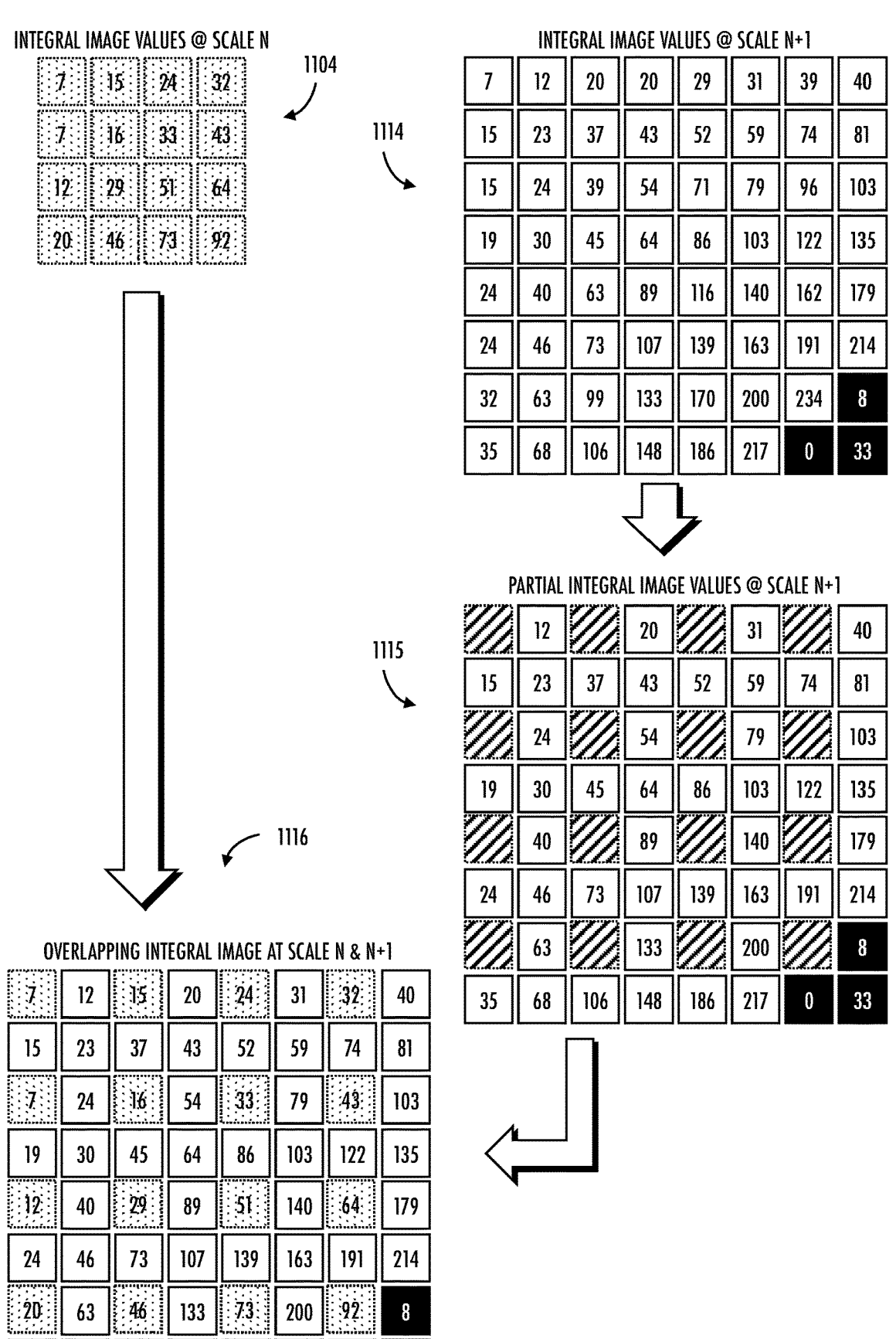
FIG. 11 is a numeric example of a cross-scale integral image, in accordance with various aspects of the present disclosure.

While the reduced precision integral image techniques provide significant benefits for computer vision processing in embedded environments, exemplary embodiments of the present disclosure further enable cross-scale combinations of integral image techniques. FIG. 11 is a logical representation of one overlapping integral image that spans two or more scales. The cross-scale integral image is created from a first integral image at a first scale 1104 and a second integral image at a second scale 1114. In this example, the first integral image at the first scale 1104 and the second integral image at the second scale 1114 are reduced precision integral images (shown with an 8-bit LSB). The larger scale is punctured to create a punctured integral image 1115; the punctured integral image 1115 is then combined with the first integral image at the first scale 1104. The resulting data structure (overlapping integral image 1116) provides two overlapping integral images at different scales.

Referring now to FIG. 12, the overlapping integral image 1206 enables patch summing across two different scales. For reference, the first image at a first scale 1202 and the second image at a second scale 1212 are shown. Notably, the two overlapping integral images cannot be jointly used. Only values from the first integral image may be used to calculate the patch sums for the first image at a first scale 1202. Similarly, only values from the second integral image may be used to calculate the patch sums for the second image at a second scale 1212.

Despite these limitations, the cross-scale integral image may be used to spatially associate the results of one patch sum at a first scale, with the patch sum of another scale based on their physically overlapping structure. Consider a scenario where an object is successfully identified at a first scale; ideally, this triggers a more comprehensive object recognition process at a second scale. Unfortunately, patch values are not preserved across the scales; thus, conventional solutions would need to perform object detection at the second scale again to identify the region for object recognition. In contrast, exemplary embodiments of the present disclosure can use the spatial association of the cross-scale integral image to directly perform object recognition at a second scale, based on the results of the object detection.

More generally, the concepts described throughout may be broadly applied to any imaging data and/or statistics which are scale specific and/or may incorporate multiple scales. For example, photosite measurements (sum of pixel values) may be used to assist with autofocus and/or auto-exposure. Since image data is captured at specific scales, offsets, etc. the statistics may also be scale specific and/or characterized by row and/or column offsets.

System Architecture

Figure 13:
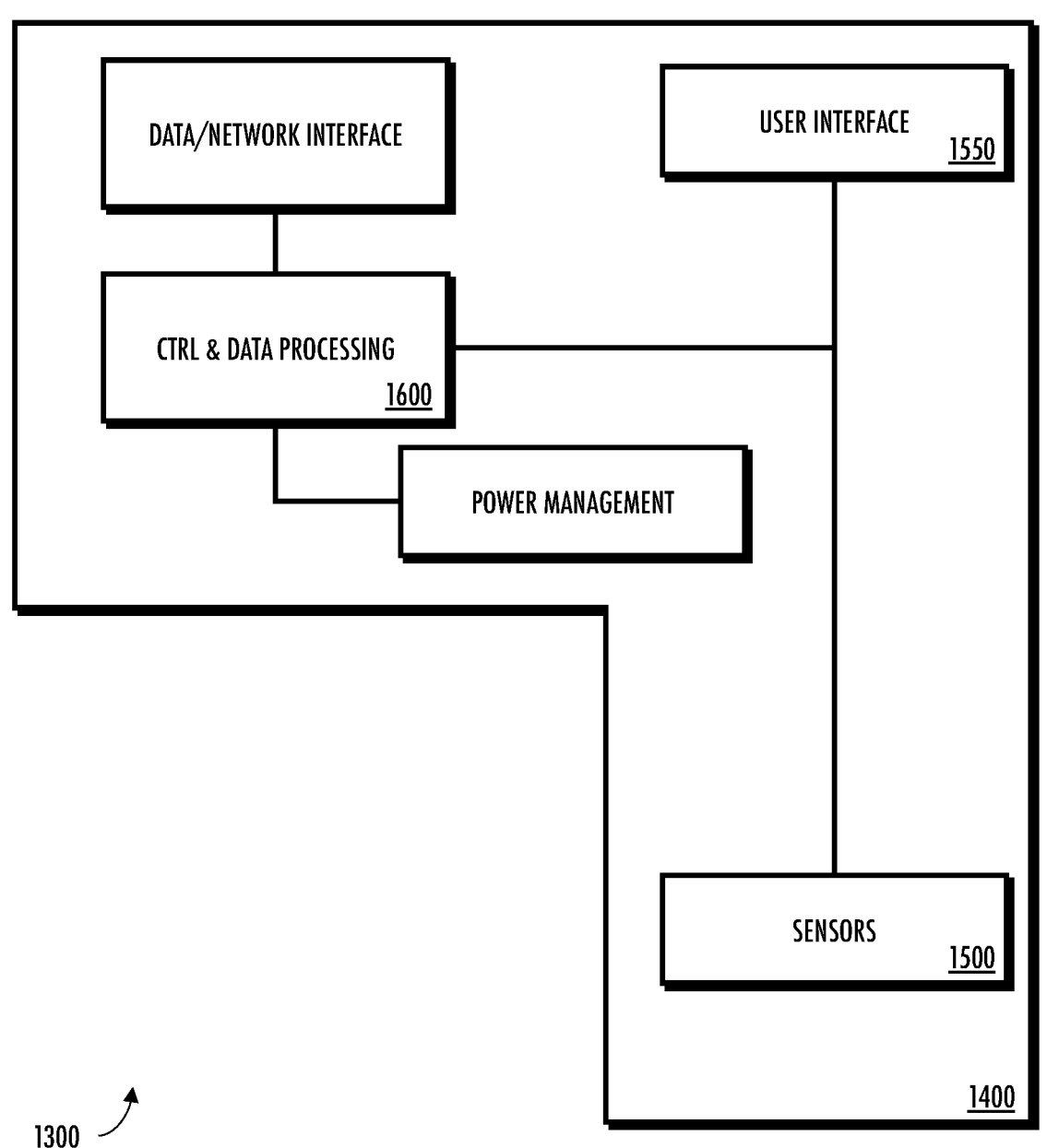
FIG. 13 is a logical block diagram of the exemplary smart glasses system, useful in conjunction with various aspects of the present disclosure.

FIG. 13 is a logical block diagram of the exemplary smart glasses system 1300. The system 1300 includes: a physical frame 1400, a sensor subsystem 1500, a user interface subsystem 1550, control and data processing logic 1600, a power management subsystem, and a data/network interface. The physical frame 1400 attaches system 1300 to the user, enabling either one or both hands to gesture (hands-free operation). The sensor subsystem 1500 captures data from the environment. The user interface subsystem 1550 monitors the user for user interactions and renders data for user consumption. The control and data processing logic 1600 obtains data generated by the user, other devices, and/or captured from the environment, to perform calculations and/or data manipulations. The resulting data may be stored, rendered to the user, transmitted to another party, or otherwise used by the system to carry out its tasks. The power management subsystem supplies and controls power for the system components. The data/network logic converts data for transmission to another device via removeable storage media or some other transmission medium.

The various logical subsystems described above may be logically combined, divided, hybridized, and/or augmented within various physical components of a device. As but one such example, an eye-tracking camera and forward-facing camera may be implemented as separate, or combined, physical assemblies. As another example, power management may be centralized within a single component or distributed among many different components; similarly, data processing logic may occur in multiple components of the system. More generally, the logical block diagram illustrates the various functional components of the system, which may be physically implemented in a variety of different manners.

While the present discussion describes scalable sensor readouts in the context of smart glasses, the system may have broad applicability to any apparatus that can use image data at different scales. Such applications may include embedded and/or mobile applications. For example, scalable sensors may allow for computer vision analysis in wearables, vehicles, and/or Internet of Things (IoT)/Industrial IoT (IIoT) applications. Examples of such devices may include smart cars, smart doorbells, smart appliances, surveillance cameras, etc.

The following discussion provides functional descriptions for each of the logical entities of the exemplary system. Artisans of ordinary skill in the related arts will readily appreciate that other logical entities that do the same work in substantially the same way to accomplish the same result are equivalent and may be freely interchanged. A specific discussion of the structural implementations, internal operations, design considerations, and/or alternatives, for each of the logical entities of the exemplary system 1300 is separately provided below.

Functional Overview of the Physical Frame

A "physical frame" or a "frame" refers to any physical structure or combination of structures that supports and/or gives shape to the components of a system.

While the present disclosure is described in the context of eyewear frames that hold the camera assembly and scalable sensor components with a fixed orientation relative to a user's head, artisans of ordinary skill in the related arts will readily appreciate that the techniques may be extended to any form of headwear including without limitation: hats, visors, helmets, goggles, and/or headsets. In fact, a physical frame may not hold the user's head at all; the frame may be based on a relatively fixed head positioning determined from a known body position and/or intended use scenario—for example, a heads-up display in a smart car may be trained for the driver's head positioning (or passenger's positioning) to allow for user interaction e.g., during driver operation, etc. As another such example, the components might be mounted-in, or distributed across, other accessories (e.g., necklaces, earrings, hairclips, etc.) that have a relatively fixed positioning relative to the user's head and torso.

As used herein, the term "hands-free" refers to operation of the device without requiring physical contact between the frame and its components, and the user's hands. Examples of physical contact (which are unnecessary during hands-free operation) may include e.g., button presses, physical taps, capacitive sensing, etc.

Furthermore, the concepts described throughout are broadly applicable to a variety of other applications beyond smart glasses. For example, a smart car may mount camera assemblies and scalable sensor components on various points of the car frame. As another example, a smart doorbell may mount the camera assembly and scalable sensor components within an access panel frame. Smart phones and/or laptops may mount the camera assembly and scalable sensor components within their component housings. Various other structural frames may be substituted with equal success.

Physical Frame, Implementation and Design Considerations

Figure 14:
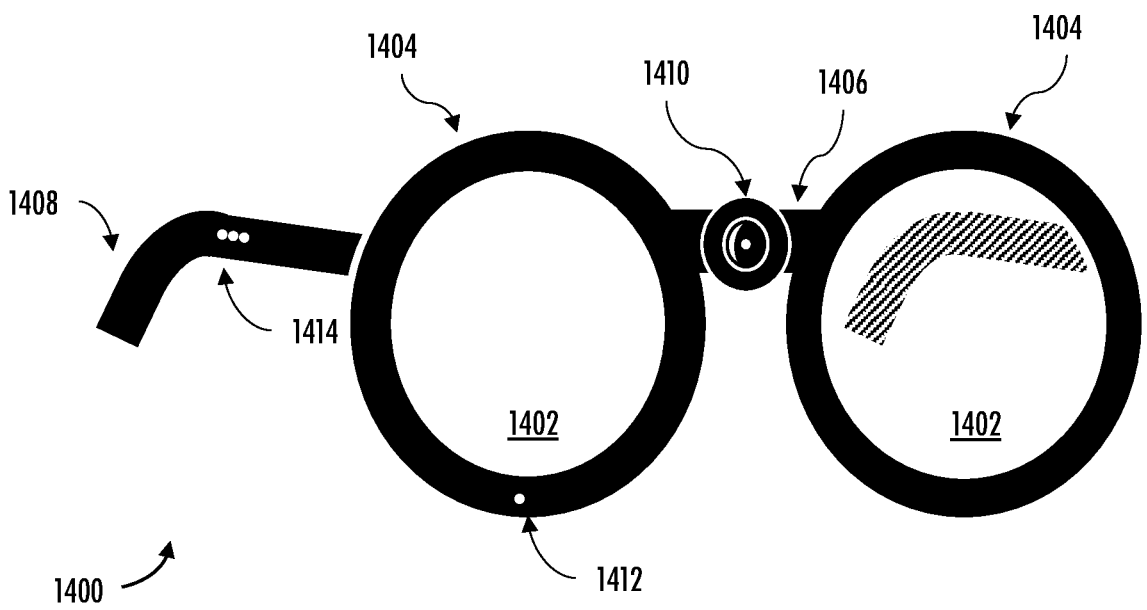
FIG. 14 is a graphical representation of a physical frame, useful in conjunction with various aspects of the present disclosure.

As shown in FIG. 14, the physical frame may be implemented as eyeglass frames that include lenses 1402 housed in rims 1404 that are connected by a bridge 1406. The bridge 1406 rests on the user's nose, and two arms 1408 rest on the user's ears. The frame may hold the various operational components of the smart glasses (e.g., camera(s) 1410, microphone(s) 1412, and speaker(s) 1414) in fixed locations relative to the user's sense/vocal organs (eyes, ears, mouth).

Physical frames may be manufactured in a variety of frame types, materials, and/or shapes. Common frame types include full-rimmed, semi-rimless, rimless, wire, and/or custom bridge (low bridge, high bridge). Full-rimmed glasses have rims that cover the full circumference of the lenses, semi-rimmed have some portion of the lens that expose an edge of the lenses, and rimless/wire glasses do not have any rim around the lenses. Some humans have differently shaped facial features; typically, custom bridge frames are designed to prevent glasses from slipping down certain types of noses. Common frame materials include plastic, acetate, wood, and metals (aluminum, stainless steel, titanium, silver, gold, etc.), and/or combinations of the foregoing. Common shapes include rectangle, oval, round, square, large, horn, brow-line, aviator, cat-eye, oversized and/or geometric shapes.

Larger and more substantial frames and materials may provide stability and/or support for mounting the various components of the device. For example, full-rimmed glasses may support a forward-facing and eye-tracking camera as well as speakers and/or microphone components, etc. Semi-rimmed and rimless/wire form factors may be lighter and/or more comfortable but may limit the capabilities of the glasses—e.g., only a limited resolution forward-facing camera to capture user hand gestures, etc. Similarly, custom bridge frames may provide more stability near the nose; this may be desirable for e.g., a more robust forward-facing camera. Material selection and/or frame types may also have functional considerations for smart glass operation; for example, plastics and woods are insulators and can manage thermal heat well, whereas metals may offer a higher strength to weight ratio.

As a practical matter, the physical frame may have a variety of "wearability" considerations e.g., thermal dissipation, device weight, battery life, etc. Some physical frame effects may be implicitly selected-for by the user. For example, even though customers often consider the physical frame to be a matter of personal style, the new capabilities described throughout may enable active functions that affect a user's experience; in some cases, this may influence the customer to make different selections compared to their non-smart eyewear, or to purchase multiple different smart glasses for different usages. Other physical frame effects may be adjusted based on user-to-frame metadata. In some cases, the user-to-frame metadata may be generated from user-specific calibration, training, and/or user configuration—in some cases, the user-to-frame metadata may be stored in data structures or "profiles". User-to-frame profiles may be useful to e.g., migrate training between different physical frames, ensure consistent usage experience across different frames, etc.

Still other implementations may incorporate other camera assemblies. For example, certain lenses have a long focal length (e.g., telephoto lenses, etc.). Applications for cameras of different types is more thoroughly discussed within U.S. patent application Ser. No. 18/185,362 filed Mar. 16, 2023, and entitled "APPARATUS AND METHODS FOR AUGMENTING VISION WITH REGION-OF-INTEREST BASED PROCESSING", U.S. patent application Ser. No. 18/185,364 filed Mar. 16, 2023, and entitled "APPARATUS AND METHODS FOR AUGMENTING VISION WITH REGION-OF-INTEREST BASED PROCESSING", and U.S. patent application Ser. No. 18/185,366 filed Mar. 16, 2023, and entitled "APPARATUS AND METHODS FOR AUGMENTING VISION WITH REGION-OF-INTEREST BASED PROCESSING", previously incorporated above.

In related variants, anamorphic cameras may provide unique advantages such as are more thoroughly discussed within U.S. patent application Ser. No. 18/316,203 filed May 11, 2023, and entitled "APPLICATIONS FOR ANAMORPHIC LENSES", U.S. patent application Ser. No. 18/316, 218 filed May 11, 2023, and entitled "APPLICATIONS FOR ANAMORPHIC LENSES", and U.S. patent application Ser. No. 18/316,221 filed May 11, 2023, and entitled "APPLICATIONS FOR ANAMORPHIC LENSES", previously incorporated above.

Functional Overview of the Sensor Subsystem

A "sensor" refers to any electrical and/or mechanical structure that measures, and records, parameters of the physical environment as analog or digital data. Most consumer electronics devices incorporate multiple different modalities of sensor data; for example, visual data may be captured as images and/or video, audible data may be captured as audio waveforms (or their frequency representations), inertial measurements may be captured as quaternions, Euler angles, or other coordinate-based representations.

While the present disclosure is described in the context of audio data, visual data, and/or IMU data, artisans of ordinary skill in the related arts will readily appreciate that the raw data, metadata, and/or any derived data may be substituted with equal success. For example, an image may be provided along with metadata about the image (e.g., facial coordinates, object coordinates, depth maps, etc.). Post-processing may also yield derived data from raw image data; for example, a neural network may process an image and derive one or more activations (data packets that identify a location of a "spike" activation within the neural network).

Sensor Subsystem, Implementation and Design Considerations

FIG. 15 is a logical block diagram of the various sensors of the sensor subsystem 1500. The sensor subsystem 1500 may include: one or more camera module(s) 1510, an audio module 1520, an accelerometer/gyroscope/magnetometer (also referred to as an inertial measurement unit (IMU 1530)), a display module (not shown), and/or Global Positioning System (GPS) system (not shown). The following sections provide detailed descriptions of the individual components of the sensor subsystem 1500.

Camera Module

A camera lens 1511 bends (distorts) light to focus on the camera sensor 1513. The camera lens 1511 may focus, refract, and/or magnify light. It is made of transparent material such as glass or plastic and has at least one curved surface. When light passes through a camera lens 1511, it is bent or refracted in a specific way, which can alter the direction, size, and/or clarity of the image that is formed.

A radially symmetric camera lenses has rotational symmetry around its optical axis. This means that the lens has the same properties and characteristics in all directions around the axis. As a practical matter, a radially symmetric camera lens is characterized by one focal length along the optical axis. Spherical lenses are examples of radially symmetric camera lenses; other lenses may be polynomial based, etc.

In contrast, a radially asymmetric camera lens has different properties and characteristics at different points along the optical axis. Anamorphic lenses are examples of radially asymmetric camera lenses. An anamorphic lens is cylindrical, and has at least two transverse axis (e.g., a major axis and a minor axes). Typically, the major axis provides an optical squeeze ratio (e.g., 2:1, 1.33:1, etc.) and the minor axis provides a normal aspect ratio (1:1), however, the major and minor axis may each have their own magnification/minification ratios. More generally, radially asymmetric camera lenses may have any number of curvatures and/or slopes.

In one specific implementation, the camera sensor 1513 senses light (luminance) via photoelectric sensors (e.g., photosites). A color filter array (CFA) 1512 filters light of a particular color; the CFA provides a color (chrominance) that is associated with each sensor. The combination of each luminance and chrominance value provides a mosaic of discrete red, green, blue value/positions, that may be "demosaiced" to recover a numeric tuple (RGB, CMYK, YUV, YCrCb, etc.) for each pixel of an image. Notably, most imaging formats are defined for the human visual spectrum; however, machine vision may use other variants of light. For example, a computer vision camera might operate on direct raw data from the image sensor with a RCCC (Red Clear Clear Clear) color filter array that provides a higher light intensity than the RGB color filter array used in media application cameras.

Camera sensor 1513 may be either a global shutter or a rolling shutter. As a brief aside, global shutter sensors expose all the photosites at the same time but read values back one-at-a-time. While the exposure time for all photosites is the same, the later read photosites may accumulate more noise due to "dark current" (i.e., electric current that flows through a photosensitive device when no photons are entering the device). Rolling shutter sensors expose different photosites at different times. Due to the difference in exposure times, certain image artifacts may be introduced during camera and/or subject motion. However, the time between exposure and readout is generally constant for rolling shutter devices—thus, rolling shutter devices do not experience the same dark current effects. Rolling shutter is also a simpler mechanism, cheaper to manufacture, and more commonly found in commodity components. Global shutter cameras do have significant advantages when used in conjunction with illuminators (such as for eye-tracking). This is because the global shutter exposure time that requires illumination is quite short, whereas rolling shutters need the illuminator to be enabled during the entire rolling exposure time. For relative comparison, the power consumption of the illuminator is often more than the camera sensor itself e.g., the illuminator may burn hundreds of milliwatts whereas a low power camera sensor may consume less than fifty milliwatts during the same interval.

As a brief aside, a "photosite" is a discrete light-sensitive component. Typically, photosites are physically arranged according to a two-dimensional pattern. While photosites are usually assumed to correspond to pixels, photosite geometry (e.g., rectangular, hexagonal, or other tessellated pattern) is device specific and irregular. In some cases, a photosite may have a "non-square" aspect ratio; for example, photosites used in phase detection auto focus (PDAF) may be rectangular in shape.

A "pixel" is the discrete unit of a digital image. A pixel defines a color value and brightness for a single point in an image. Since images are represented as a two-dimensional array, a pixel is assumed to be "square".

As used herein, the term "square" refers to geometric relationships and properties generally associated with a polygon with four equal sides and four equal angles. As a practical matter, few pixels are perfectly square; thus, any polygon that is tessellated at regular intervals in two orthogonal dimensions is considered "square." More directly, a square pixel refers to a pixel that is as wide as it is tall. "Substantially square" refers to a polygon with an aspect ratio that falls in the range 1.2:1 and 0.8:1. The term "non-square" refers to any geometric relationship other than a square. Thus, a non-square photosite might be rectangular with an aspect ratio of 1.33:1 or 2:1, hexagonally tessellated, etc.

The camera sensor 1513 may be read using the readout logic 1514. Conventional readout logic uses row enables and column reads to provide readouts in a sequential row-by-row manner. Historically, display devices were unaware of image capture but could optimize for their own raster-graphics scan line style of operation. Conventional data formats assign one dimension to be "rows" and another dimension to be "columns"; the row and column nomenclature is used by other components and/or devices to access data. Most (if not all) devices assume that scan lines are rows that run horizontally (left to right), and columns that run vertically (top to bottom), consistent with conventional raster-scan style operation.

Conventional readout logic 1514 may additionally incorporate binning and/or skipping readouts. For example, some cameras use an N-Bayer sensor that groups four, or even nine, "pixels" together to create a "binned pixel". During image signal processing, color information is re-distributed across the binned pixels with a technique called "pixel binning". Pixel-binning provides better results and versatility than just interpolation/upscaling. For example, a camera can capture high resolution images (e.g., 108 MPixels) in full-light; but in low-light conditions, the camera can emulate a much larger photosite with the same sensor (e.g., grouping pixels in sets of 9 to get a 12 MPixel "nona-binned" resolution).

Various embodiments described herein modify the readout logic 1514 to provide non-sequential scale-based readouts. In one specific implementation, scalable row enable logic enables rows and scalable column read logic reads columns according to a scale parameter. The scale parameter allows captured image data to be read out at different scales. In one specific implementation, the scales may be based on a binary sampling scheme that uses bit-reversed addressing. Some variants may incorporate offsets and/or mirroring. More generally, any scheme for sampling the image data according to reduced scales may be substituted with equal success.

As used herein, the term "scale" and its linguistic derivatives refers to a size and/or magnitude selected from a data set that may be characterized according to multiple sizes and/or magnitudes. For example, image data at a first resolution corresponds to a first scale, an upscaled or downscaled version of the image data at a second resolution corresponds to a second scale, etc. The term "scalable" and its linguistic derivatives refers to a process and/or apparatus that can be parameterized according to selected scale(s). Thus, a scalable camera sensor may provide image data at a selected scale from multiple different scales.

In one specific implementation, the readout logic 1514 may provide multiple completed scale readouts corresponding to an image capture. In one specific implementation, the lowest scale (smallest resolution) may be provided first, subsequent scale readouts increase the scale size until the full resolution is provided. In some cases, the scale readouts may be provided as a data stream; in other cases, the scale readouts may be provided as data structures (e.g., memory buffers). Providing completed scale readouts before the full resolution has been provided allows for preliminary processing at lower scales; this may be useful to direct subsequent processing and/or instruct early termination.

In some variants, the readout logic 1514 may further select rows and/or columns to effectuate cropping, shrinking, stretching, rotation, and/or other image manipulations). The readout logic 1514 may obtain preconfigured parameters and/or monitor for environmental changes which might require image correction. For example, quaternions or other tilt information may be provided via the Inertial Measurement Unit and Positioning, discussed below.

By handling corrections in the camera sensor, downstream processing may be greatly reduced. For example, level-corrections handled at the camera sensor can compensate for changes in camera orientation which reduces unnecessary data transfer and greatly improves computer vision performance.

A "digital image" is a two-dimensional array of pixels (or binned pixels). Virtually all imaging technologies are descended from (and inherit the assumptions of) raster-graphics displays which displayed images line-by-line. The aspect ratio of a digital image may be any number of pixels wide and high. However, images are generally assumed to be longer than they are tall (the rows are larger than columns).

During operation, the first device may make use of multiple camera systems to assess user interactions and the physical environment. The smart glasses may have one or more outward-facing cameras to capture the user's environment. Multiple forward-facing cameras can be used to capture different fields-of-view and/or ranges. Cameras with a non-fixed/"zoom" lens may also change its focal length to capture multiple fields of view. For example, a medium range camera might have a horizontal field-of-view (FOV) of 70°-120° whereas long range cameras may use a FOV of 35°, or less, and have multiple aperture settings. In some cases, a "wide" FOV camera (so-called fisheye lenses provide between 120° and 195°) may be used to capture periphery information along two transverse axes. In some implementations, one or more anamorphic cameras may be used to capture a wide FOV in a first axis (major axis) and a medium range FOV in a second axis (minor axis).

The smart glasses may have one or more inward-facing cameras to capture the user's interactions. Multiple cameras can be used to capture different views of the eyes for eye-tracking. In some implementations, one or more anamorphic cameras may be used to track eye movement. Other implementations may use normal FOV cameras that are stitched together or otherwise processed jointly.

More generally, however, any camera lens or set of camera lenses may be substituted with equal success for any of the foregoing tasks; including e.g., narrow field-of-view (10° to 90°) and/or stitched variants (e.g., 360° panoramas). While the foregoing techniques are described in the context of perceptible light, the techniques may be applied to other electromagnetic (EM) radiation capture and focus apparatus including without limitation: infrared, ultraviolet, and/or X-ray, etc.

The camera module(s) 1510 may include on-board image signal processing and/or neural network processing. On-board processing may be implemented within the same silicon or on a stacked silicon die (within the same package/module). Silicon and stacked variants reduce power consumption relative to discrete component alternatives that must be connected via external wiring, etc. Processing functionality is discussed elsewhere (see e.g., Control and Data Subsystem, further below).

In one exemplary embodiment, the camera module(s) 1510 incorporates on-board logic to generate image analysis statistics and/or perform limited image analysis. As but one such example, the camera sensor may generate integral image data structures at varying scales. In some cases, the integral images may have reduced precision (e.g., only 8-bits, 12-bits, 16-bits, of precision). Notably, even at reduced precision, integral images may be used to calculate the sum of values in a patch of an image. This may enable lightweight computer vision algorithms that perform detection and/or recognition of objects, faces, text, etc. Applications for preliminary computer vision assessments are broadly applicable to staged processing, such as is described in greater detail within U.S. patent application Ser. No. 18/061,203 filed Dec. 2, 2022, and entitled "SYSTEMS, APPARATUS, AND METHODS FOR GESTURE-BASED AUGMENTED REALITY, EXTENDED REALITY", U.S. patent application Ser. No. 18/061,226 filed Dec. 2, 2022, and entitled "SYSTEMS, APPARATUS, AND METHODS FOR GESTURE-BASED AUGMENTED REALITY, EXTENDED REALITY", and U.S. patent application Ser. No. 18/061,257 filed Dec. 2, 2022, and entitled "SYSTEMS, APPARATUS, AND METHODS FOR GESTURE-BASED AUGMENTED REALITY, EXTENDED REALITY", previously incorporated by reference above.

More generally, a variety of applications may leverage preliminary image analysis statistics. For example, computer-assisted searches and/or other recognition algorithms, etc. are discussed in greater detail within U.S. patent application Ser. No. 18/185,362 filed Mar. 16, 2023, and entitled "APPARATUS AND METHODS FOR AUGMENTING VISION WITH REGION-OF-INTEREST BASED PROCESSING", U.S. patent application Ser. No. 18/185,364 filed Mar. 16, 2023, and entitled "APPARATUS AND METHODS FOR AUGMENTING VISION WITH REGION-OF-INTEREST BASED PROCESSING", and U.S. patent application Ser. No. 18/185,366 filed Mar. 16, 2023, and entitled "APPARATUS AND METHODS FOR AUGMENTING VISION WITH REGION-OF-INTEREST BASED PROCESSING", previously incorporated by reference above.

Audio Module

The audio module 1520 typically incorporates a microphone 1522, speaker 1524, and an audio codec 1526. The microphone senses acoustic vibrations and converts the vibrations to an electrical signal (via a transducer, condenser, etc.). The electrical signal is provided to the audio codec, which samples the electrical signal and converts the time domain waveform to its frequency domain representation. Typically, additional filtering and noise reduction may be performed to compensate for microphone characteristics. The resulting audio waveform may be compressed for delivery via any number of audio data formats. To generate audible sound, the audio codec 1526 obtains audio data and decodes the data into an electrical signal. The electrical signal can be amplified and used to drive the speaker 1524 to generate acoustic waves.

Commodity audio codecs generally fall into speech codecs and full spectrum codecs. Full spectrum codecs use the modified discrete cosine transform (mDCT) and/or mel-frequency cepstral coefficients (MFCC) to represent the full audible spectrum. Speech codecs reduce coding complexity by leveraging the characteristics of the human auditory/ speech system to mimic voice communications. Speech codecs often make significant trade-offs to preserve intelligibility, pleasantness, and/or data transmission considerations (robustness, latency, bandwidth, etc.).

While the audio module 1520 depicts a single microphone and speaker, an audio module may have any number of microphones and/or speakers. For example, multiple speakers may be used to generate stereo sound and multiple microphones may be used to capture stereo sound. More broadly, any number of individual microphones and/or speakers can be used to constructively and/or destructively combine acoustic waves (also referred to as beamforming).

The audio module 1520 may include on-board audio processing and/or neural network processing to assist with voice analysis and synthesis. These functions are discussed elsewhere (see e.g., Control and Data Subsystem, further below).

Inertial Measurement Unit and Positioning

The inertial measurement unit (IMU) 1530 includes one or more accelerometers, gyroscopes, and/or magnetometers. Typically, an accelerometer uses a damped mass and spring assembly to measure proper acceleration (i.e., acceleration in its own instantaneous rest frame). In many cases, accel-erometers may have a variable frequency response. Most gyroscopes use a rotating mass to measure angular velocity; a MEMS (microelectromechanical) gyroscope may use a pendulum mass to achieve a similar effect by measuring the pendulum's perturbations. Most magnetometers use a ferromagnetic element to measure the vector and strength of a magnetic field; other magnetometers may rely on induced currents and/or pickup coils. The IMU uses the acceleration, angular velocity, and/or magnetic information to calculate quaternions that define the relative motion of an object in four-dimensional (4D) space. Quaternions can be efficiently computed to determine velocity (both head direction and speed).

More generally, however, any scheme for detecting user velocity (direction and speed) may be substituted with equal success for any of the foregoing tasks. Other useful information may include pedometer and/or compass measurements. While the foregoing techniques are described in the context of an inertial measurement unit (IMU) that provides quaternion vectors, artisans of ordinary skill in the related arts will readily appreciate that raw data (acceleration, rotation, magnetic field) and any of their derivatives may be substituted with equal success.

Global Positioning System (GPS) is a satellite-based radio navigation system that allows a user device to triangulate its location anywhere in the world. Each GPS satellite carries very stable atomic clocks that are synchronized with one another and with ground clocks. Any drift from time maintained on the ground is corrected daily. In the same manner, the satellite locations are known with great precision. The satellites continuously broadcast their current position. During operation, GPS receivers attempt to demodulate GPS satellite broadcasts. Since the speed of radio waves is constant and independent of the satellite speed, the time delay between when the satellite transmits a signal and the receiver receives it is proportional to the distance from the satellite to the receiver. Once received, a GPS receiver can triangulate its own four-dimensional position in spacetime based on data received from multiple GPS satellites. At a minimum, four satellites must be in view of the receiver for it to compute four unknown quantities (three position coordinates and the deviation of its own clock from satellite time). In so-called "assisted GPS" implementations, ephemeris data may be downloaded from cellular networks to reduce processing complexity (e.g., the receiver can reduce its search window).

The IMU 1530 may include on-board telemetry processing and/or neural network processing to assist with telemetry analysis and synthesis. These functions are discussed elsewhere (see e.g., Control and Data Subsystem, further below).

Various implementations of the IMU may include logic to identify an orientation during exposures. For example, in one exemplary embodiment, the IMU may include a latch, register, or other sequential logic to capture the measured orientation (or a filtered version) at the moment of exposure. In other embodiments, the IMU may include an array of vectors that define the motion of the camera assembly over time; this may be used to interpolate a position of the camera at the moment of capture.

The orientation information may be used by scalable addressing logic to correct for camera orientation. In some embodiments, the orientation information may be used to infer a slope (or ratio) that defines a change of rows per a change of columns. In some variants, the orientation information may be used to infer a stretch or shrink as a function of the change of rows and/or change of columns (horizontal and/or vertical keystoning).

In still other embodiments, the IMU may provide quaternions and/or raw data (acceleration, rotation, magnetic field) and any of their derivatives to the camera sensor readout logic.

Functional Overview of the User Interface Subsystem

Functionally, the "user interface" refers to the physical and logical components of the system that interact with the human user. A "physical" user interface refers to electrical and/or mechanical devices that the user physically interacts with. An "augmented reality" user interface refers to a user interface that incorporates an artificial environment that has been overlaid on the user's physical environment. A "virtual reality" user interface refers to a user interface that is entirely constrained within a "virtualized" artificial environment. An "extended reality" user interface refers to any user interface that lies in the spectrum from physical user interfaces to virtual user interfaces.

User Interface Subsystem, Implementation and Design Considerations

The user interface subsystem 1550 encompasses the visual, audio, and tactile elements of the device that enable a user to interact with it. In addition to physical user interface devices that use physical buttons, switches, and/or sliders to register explicit user input, the user interface subsystem may also incorporate various components of the sensor subsystem 1500 to sense user interactions. For example, the user interface may include: a display module to present information, eye-tracking camera sensor(s) to monitor gaze fixation, hand-tracking camera sensor(s) to monitor for hand gestures, a speaker to provide audible information, and a microphone to capture voice commands, etc.

Display Module

The display module (not shown) is an output device for presentation of information in a visual form. Different display configurations may internalize or externalize the display components within the lens. For example, some implementations embed optics or waveguides within the lens and externalize the display as a nearby projector or micro-LEDs. As another such example, some implementations project images into the eyes.

In one exemplary embodiment, the display module may be incorporated within the device as a display that is overlaps the user's visual field. Examples of such implementations may include so-called "heads up displays" (HUDs) that are integrated within the lenses, or projection/reflection type displays that use the lens components as a display area. Existing integrated display sizes are typically limited to the lens form factor, and thus resolutions may be smaller than handheld devices e.g., 640×320, 1280×640, 1980×1280, etc. For comparison, handheld device resolutions that exceed 2560×1280 are not unusual for smart phones, and tablets can often provide 4K UHD (3840×2160) or better. In some embodiments, the display module may be external to the glasses and remotely managed by the device (e.g., screen casting). For example, the smart glasses can encode a video stream that is sent to a user's smart phone or tablet for display.

The display module may be used where the smart glasses present and provide interaction with text, pictures, and/or AR/XR objects. For example, the AR/XR object may be a virtual keyboard and a virtual mouse. During such operation, the user may invoke a command (e.g., a hand gesture) that causes the smart glasses to present the virtual keyboard for typing by the user. The virtual keyboard is provided by presenting images on the smart glasses such that the user may type without contact to a physical object. One of ordinary skill in the art will appreciate that the virtual keyboard (and/or mouse) may be displayed as an overlay on a physical object, such as a desk, such that the user is technically touching a real-world object. However, input is measured by tracking user movements relative to the overlay, previous gesture position(s), etc. rather than receiving a signal from the touched object (e.g., as a conventional keyboard would).

Eye-Tracking and Hand-Tracking Modules

The user interface subsystem may incorporate an "eye-tracking" camera to monitor for gaze fixation (a user interaction event) by tracking saccadic or microsaccadic eye movements. Eye-tracking embodiments may greatly simplify camera operation since the eye-tracking data is primarily captured for standby operation (discussed below). In addition, the smart glasses may incorporate "hand-tracking" or gesture-based inputs. Gesture-based inputs and user interactions are more broadly described within e.g., U.S. patent application Ser. No. 18/061,203 filed Dec. 2, 2022, and entitled "SYSTEMS, APPARATUS, AND METHODS FOR GESTURE-BASED AUGMENTED REALITY, EXTENDED REALITY", U.S. patent application Ser. No. 18/061,226 filed Dec. 2, 2022, and entitled "SYSTEMS, APPARATUS, AND METHODS FOR GESTURE-BASED AUGMENTED REALITY, EXTENDED REALITY", and U.S. patent application Ser. No. 18/061,257 filed Dec. 2, 2022, and entitled "SYSTEMS, APPARATUS, AND METHODS FOR GESTURE-BASED AUGMENTED REALITY, EXTENDED REALITY", previously incorporated by reference in their entireties.

While the present discussion describes eye-tracking and hand-tracking cameras, the techniques are broadly applicable to any outward-facing and inward-facing cameras. As used herein, the term "outward-facing" refers to cameras that capture the surroundings of a user and/or the user's relation relative to the surroundings. For example, a rear outward-facing camera could be used to capture the surroundings behind the user. Such configurations may be useful for gaming applications and/or simultaneous localization and mapping (SLAM-based) applications. As used herein, the term "inward-facing" refers to cameras that capture the user e.g., to infer user interactions, etc.

Voice Control and Audio Speaker Modules

The user interface subsystem may incorporate microphones to collect the user's vocal instructions as well as the environmental sounds. As previously noted above, the audio module may include on-board audio processing and/or neural network processing to assist with voice analysis and synthesis.

The user interface subsystem may also incorporate speakers to reproduce audio waveforms. In some cases, the speakers may incorporate noise reduction technologies and/or active noise cancelling to cancel out external sounds, creating a quieter listening environment for the user. This may be particularly useful for sensory augmentation in noisy environments, etc.

Functional Overview of the Control and Data Processing Subsystem

Functionally, the control and data subsystem controls the operation of a device and stores and processes data. Logically, the control and data subsystem may be subdivided into a "control path" and a "data path." The data path is responsible for performing arithmetic and logic operations on data. The data path generally includes registers, arithmetic and logic unit (ALU), and other components that are needed to manipulate data. The data path also includes the memory and input/output (I/O) devices that are used to store and retrieve data. In contrast, the control path controls the flow of instructions and data through the subsystem. The control path usually includes a control unit, that manages a processing state machine (e.g., a program counter which keeps track of the current instruction being executed, instruction register which holds the current instruction being executed, etc.). During operation, the control path generates the signals that manipulate data path operation. The data path performs the necessary operations on the data, and the control path moves on to the next instruction, etc.

Control and Data, Implementation and Design Considerations

The control and data processing logic may include one or more of: a central processing unit (CPU), an image signal processor (ISP), one or more neural network processors (NPUs), and their corresponding non-transitory computer-readable media that store program instructions and/or data. In one exemplary embodiment, the control and data subsystem includes processing units that execute instructions stored in a non-transitory computer-readable medium (memory). More generally however, other forms of control and/or data may be substituted with equal success, including e.g., neural network processors, dedicated logic (field programmable gate arrays (FPGAs), application specific integrated circuits (ASICs)), and/or other software, firmware, and/or hardware implementations.

Processor and Memory Implementations

As a practical matter, different processor architectures attempt to optimize their designs for their most likely usages. More specialized logic can often result in much higher performance (e.g., by avoiding unnecessary operations, memory accesses, and/or conditional branching). For example, a general-purpose CPU may be primarily used to control device operation and/or perform tasks of arbitrary complexity/best-effort. CPU operations may include, without limitation: operating system (OS) functionality (power management, UX), memory management, gesture-specific tasks, etc. Typically, such CPUs are selected to have relatively short pipelining, longer words (e.g., 32-bit, 64-bit, and/or super-scalar words), and/or addressable space that can access both local cache memory and/or pages of system virtual memory. More directly, a CPU may often switch between tasks, and must account for branch disruption and/or arbitrary memory access.

In contrast, the image signal processor (ISP) performs many of the same tasks repeatedly over a well-defined data structure. Specifically, the ISP maps captured camera sensor data to a color space. ISP operations often include, without limitation: demosaicing, color correction, white balance, and/or autoexposure. Most of these actions may be done with scalar vector-matrix multiplication. Raw image data has a defined size and capture rate (for video) and the ISP operations are performed identically for each pixel; as a result, ISP designs are heavily pipelined (and seldom branch), may incorporate specialized vector-matrix logic, and often rely on reduced addressable space and other task-specific optimizations. ISP designs only need to keep up with the camera sensor output to stay within the real-time budget; thus, ISPs more often benefit from larger register/data structures and do not need parallelization.

Other processor subsystem implementations may multiply, combine, further subdivide, augment, and/or subsume the foregoing functionalities within these or other processing elements. For example, multiple ISPs may be used to service multiple camera sensors. Similarly, neural network functionality (discussed below) may be subsumed with either CPU or ISP operation via software emulation.

Neural Network and Machine Learning Implementations

The device may include one or more neural network processors (NPUs). Unlike conventional "Turing"-based processor architectures (discussed above), neural network processing emulates a network of connected nodes (also known as "neurons") that loosely model the neuro-biological functionality found in the human brain. While neural network computing is still in its infancy, such technologies already have great promise for e.g., compute rich, low power, and/or continuous processing applications.

Within the context of the present disclosure, the NPUs may be used to analyze the presence of one or more user interaction(s) at varying levels of confidence. Conventional image processing techniques process the entire image data structure, an NPU may process subsets/aspects of the image data. The computational complexity may be scaled according to the stage (which corresponds to the confidence of detection). Conceptually, neural network processing uses a collection of small nodes to loosely model the biological behavior of neurons. Each node receives inputs, and generates output, based on a neuron model (usually a rectified linear unit (ReLU), or similar). The nodes are connected to one another at "edges". Each node and edge are assigned a weight.

Each processor node of a neural network combines its inputs according to a transfer function to generate the outputs. The set of weights can be configured to amplify or dampen the constituent components of its input data. The input-weight products are summed and then the sum is passed through a node's activation function, to determine the size and magnitude of the output data. "Activated" neurons (processor nodes) generate output "activations". The activation may be fed to another node or result in an action on the environment. Coefficients may be iteratively updated with feedback to amplify inputs that are beneficial or dampen inputs that are not.

The behavior of the neural network may be modified during an iterative training process by adjusting the node/edge weights to reduce an error gradient. The computational complexity of neural network processing is a function of the number of nodes in the network. Neural networks may be sized (and/or trained) for a variety of different considerations. For example, increasing the number of nodes may improve performance and/or robustness noise rejection whereas reducing the number of nodes may reduce power consumption and/or improve latency.

Many neural network processors emulate the individual neural network nodes as software threads, and large vector-matrix multiply accumulates. A "thread" is the smallest discrete unit of processor utilization that may be scheduled for a core to execute. A thread is characterized by: (i) a set of instructions that is executed by a processor, (ii) a program counter that identifies the current point of execution for the thread, (iii) a stack data structure that temporarily stores thread data, and (iv) registers for storing arguments of opcode execution. Other implementations may use hardware or dedicated logic to implement processor node logic, however neural network processing is still in its infancy and has not yet become a commoditized semiconductor technology.

As used herein, the term "emulate" and its linguistic derivatives refers to software processes that reproduce the function of an entity based on a processing description. For example, a processor node of a machine learning algorithm may be emulated with "state inputs", and a "transfer function", that generate an "action."

Unlike the Turing-based processor architectures, machine learning algorithms learn a task that is not explicitly described with instructions. In other words, machine learning algorithms seek to create inferences from patterns in data using e.g., statistical models and/or analysis. The inferences may then be used to formulate predicted outputs that can be compared to actual output to generate feedback. Each iteration of inference and feedback is used to improve the underlying statistical models. Since the task is accomplished through dynamic coefficient weighting rather than explicit instructions, machine learning algorithms can change their behavior over time to e.g., improve performance, change tasks, etc.

Typically, machine learning algorithms are "trained" until their predicted outputs match the desired output (to within a threshold similarity). Training is broadly categorized into "offline" training and "online" training. Offline training models are trained once using a static library, whereas online training models are continuously trained on "live" data. Offline training allows for reliable training according to known data and is suitable for well-characterized behaviors. Furthermore, offline training on a single data set can be performed much faster and at a fixed power budget/training time, compared to online training via live data. However, online training may be necessary for applications that must change based on live data and/or where the training data is only partially-characterized/uncharacterized. Many implementations combine offline and online training to e.g., provide accurate initial performance that adjusts to system-specific considerations over time.

In some implementations, the neural network processor may be a standalone component of the system. In such implementations, the neural network processor may translate activation data (e.g., neural network node activity) into data structures that are suitable for system-wide use. Typically, such implementations use a data structure defined according to application programming interfaces (APIs) exposed by other components. Functionally, an API interface allows one program to request/provide a service to another program; while the exemplary system allows API calls between separate components, the API framework may be used with equal success within a component. For example, a system-on-a-chip (SoC) may provide the activation data and/or its associated metadata via an API. Some SoC implementations may also provide memory-mapped accessibility for direct data manipulation (e.g., via a CPU).

In some implementations, the NPU may be incorporated within a sensor (e.g., a camera sensor) to process data captured by the sensor. By coupling an NPU closely (on-die) with the sensor, the processing may be performed with lower power demand. In one aspect, the sensor processor may be designed as customized hardware that is dedicated to processing the data necessary to enable interpretation of relatively simple user interaction(s) to enable more elaborate gestures. In some cases, the sensor processor may be coupled to a memory that is configured to provide storage for the data captured and processed by the sensor. The sensor processing memory may be implemented as SRAM, MRAM, registers, or a combination thereof.

Conventional computer vision algorithms generate post-processed image data (a 2-dimensional array of pixel data)

whereas neural network vision computer vision generates activations. Neural network-based image recognition may have multiple advantages over conventional image recognition techniques. Raw image capture data (e.g., photosite values) are camera-specific i.e., the pixel values are a combination of both the photosite and color-filter array geometry. Raw image capture data cannot be directly displayed to a human as a meaningful image-instead raw image data must be "developed" into standardized display formats (e.g., JPEG, TIFF, MPEG, etc.). The developing process incurs multiple ISP image operations e.g., demosaicing, white balance, color adjustment, etc. In contrast, neural network processing can be trained to use raw image data (e.g., photosite values) as input rather than post-ISP image data (as is done with conventional image recognition techniques). Furthermore, neural network activations represent a node state within the neural network i.e., that the node has accumulated signal potential above a threshold value. If properly trained, neural networks can provide robust detection with very little power. Activation data is both much less frequent, and much more compact, compared to post-processed image/video data.

On-chip neural network processing at the sensor and can convey activations off-chip, such as is more generally described within e.g., U.S. patent application Ser. No. 18/061,203 filed Dec. 2, 2022, and entitled "SYSTEMS, APPARATUS, AND METHODS FOR GESTURE-BASED AUGMENTED REALITY, EXTENDED REALITY", U.S. patent application Ser. No. 18/061,226 filed Dec. 2, 2022, and entitled "SYSTEMS, APPARATUS, AND METHODS FOR GESTURE-BASED AUGMENTED REALITY, EXTENDED REALITY", and U.S. patent application Ser. No. 18/061,257 filed Dec. 2, 2022, and entitled "SYSTEMS, APPARATUS, AND METHODS FOR GESTURE-BASED AUGMENTED REALITY, EXTENDED REALITY", previously incorporated by reference in their entireties.

As a related tangent, on-sensor processing of the present disclosure may have particularly synergistic results with off-chip processing. For example, on-sensor processing of scaled readouts may be used to detect (or even recognize) user interactions of various complexity and/or initiate more complex processing at an ISP, CPU, DSP, NPU, etc. As another example, on-sensor processing of scaled readouts may identify early termination opportunities at lower scales to prevent unnecessary processing at higher scales (saving power, etc.).

In some cases, on-sensor processing may be done in parallel with off-sensor processing that offer more or different functionalities. Coordinating on-sensor and off-sensor processing may provide multiple benefits: smaller scale readouts take less power to transfer and process. Furthermore, consuming more power to re-orient images, collect statistics, and/or calculate an integral image on the camera sensor may be more efficient compared to other alternatives (e.g., sending unnecessary scales, etc.).

While the foregoing discussion is presented in the context of visual data, the concepts are broadly applicable to all sensed modalities (e.g., audio, IMU, etc.). For example, rather than sending a continuous audio file, an audio processor might only send specific audio snippets, or even audio which has been pre-processed.

Other Notable Logic Implementations

Application specific integrated circuits (ASICs) and field-programmable gate arrays (FPGAs) are other "dedicated logic" technologies that can provide suitable control and data processing for a smart glasses system. These technologies are based on register-transfer logic (RTL) rather than procedural steps. In other words, RTL describes combinatorial logic, sequential gates, and their interconnections (i.e., its structure) rather than instructions for execution. While dedicated logic can enable much higher performance for mature logic (e.g., 50×+ relative to software alternatives), the structure of dedicated logic cannot be altered at run-time and is considerably less flexible than software.

Application specific integrated circuits (ASICs) directly convert RTL descriptions to combinatorial logic and sequential gates. For example, a 2-input combinatorial logic gate (AND, OR, XOR, etc.) may be implemented by physically arranging 4 transistor logic gates, a flip-flop register may be implemented with 12 transistor logic gates. ASIC layouts are physically etched and doped into silicon substrate; once created, the ASIC functionality cannot be modified. Notably, ASIC designs can be incredibly power-efficient and achieve the highest levels of performance. Unfortunately, the manufacture of ASICs is expensive and cannot be modified after fabrication—as a result, ASIC devices are usually only used in very mature (commodity) designs that compete primarily on price rather than functionality.

FPGAs are designed to be programmed "in-the-field" after manufacturing. FPGAs contain an array of look-up-table (LUT) memories (often referred to as programmable logic blocks) that can be used to emulate a logical gate. As but one such example, a 2-input LUT takes two bits of input which address 4 possible memory locations. By storing "1" into the location of 0 #b'11 and setting all other locations to be "0" the 2-input LUT emulates an AND gate. Conversely, by storing "0" into the location of 0 #b'00 and setting all other locations to be "1" the 2-input LUT emulates an OR gate. In other words, FPGAs implement Boolean logic as memory—any arbitrary logic may be created by interconnecting LUTs (combinatorial logic) to one another along with registers, flip-flops, and/or dedicated memory blocks. LUTs take up substantially more die space than gate-level equivalents; additionally, FPGA-based designs are often only sparsely programmed since the interconnect fabric may limit "fanout." As a practical matter, an FPGA may offer lower performance than an ASIC (but still better than software equivalents) with substantially larger die size and power consumption. FPGA solutions are often used for limited-run, high performance applications that may evolve over time.

Scale-Based Sensor Readout, Generalized Operation

In one embodiment, the control and data processing subsystem may be used to store data locally at the device. In one exemplary embodiment, data may be stored as non-transitory symbols (e.g., bits read from non-transitory computer-readable mediums). In one specific implementation, a memory subsystem including non-transitory computer-readable medium is physically realized as one or more physical memory chips (e.g., NAND/NOR flash) that are logically separated into memory data structures. The memory subsystem may be bifurcated into program code and/or program data. In some variants, program code and/or program data may be further organized for dedicated and/or collaborative use. For example, the ISP and CPU may share a common memory buffer to facilitate large transfers of data therebetween. Similarly, the codec may have a dedicated memory buffer to avoid resource contention.

In some embodiments, the program code may be statically stored within the device as firmware. In other embodiments, the program code may be dynamically stored (and changeable) via software updates. In some such variants, software may be subsequently updated by external parties and/or the user, based on various access permissions and procedures.

Figure 16A:
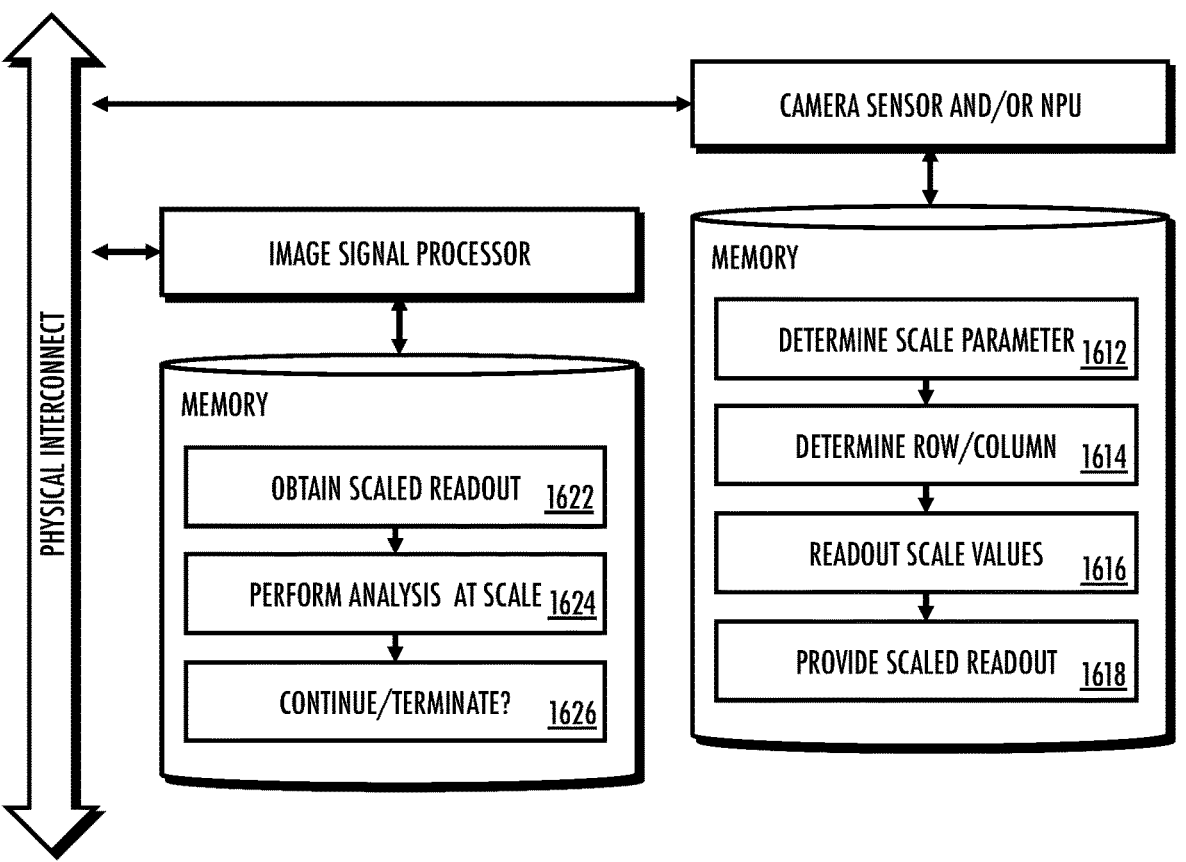
FIG. 16A depicts a generalized implementation of scale-based sensor processing, in accordance with various aspects of the present disclosure.
Figure 16B:
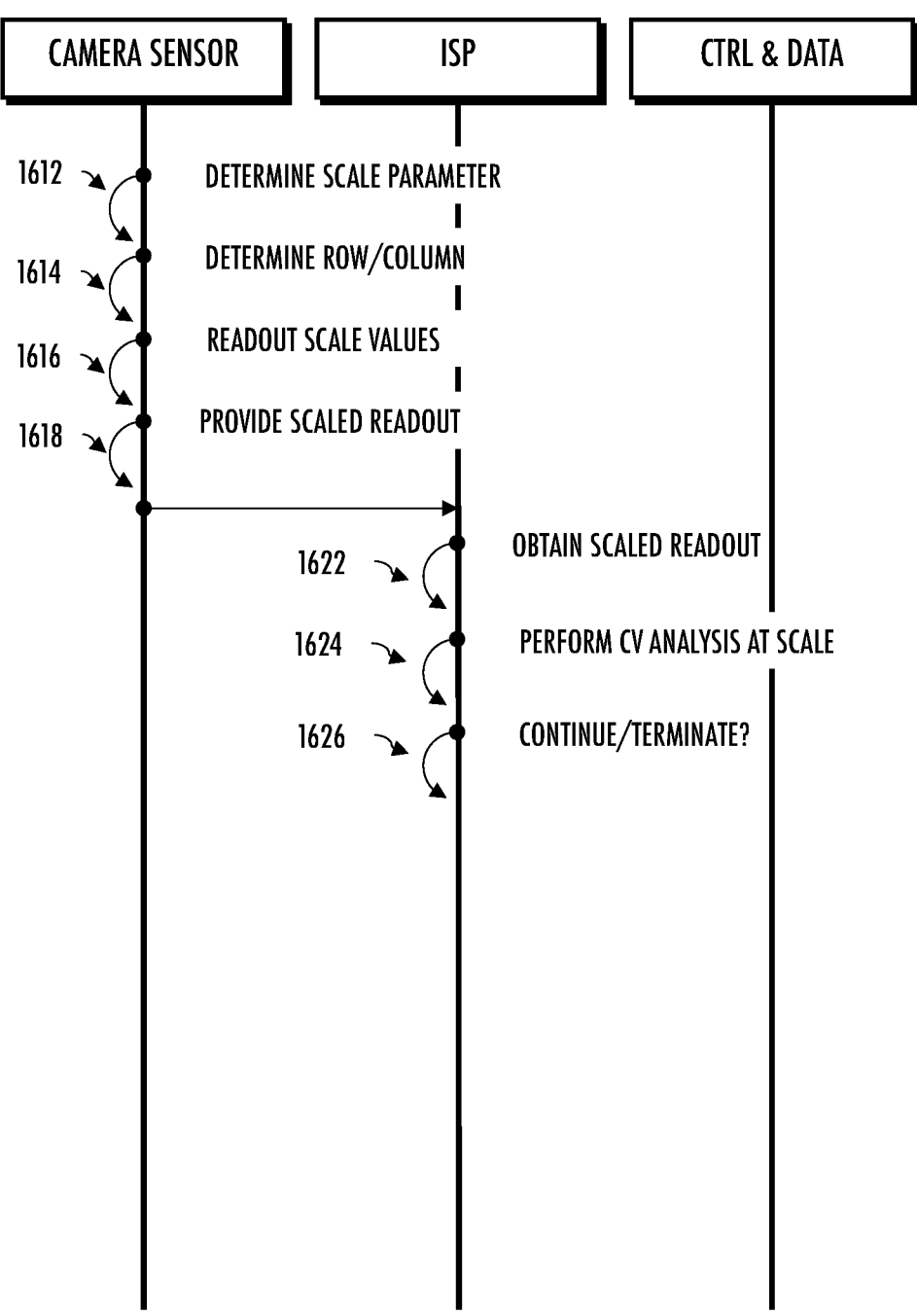
FIG. 16B depicts a chronological sequence (ladder diagram) of scale-based sensor processing, according to the logic of FIG. 16A.

FIG. 16A depicts a generalized implementation of scale-based sensor readouts and scale-based processing. In addition, FIG. 16B depicts a chronological sequence (ladder diagram) of scale-based sensor readouts and scale-based processing, according to the logic of FIG. 16A. In the illustrated embodiment, the non-transitory computer-readable medium includes a first routine that captures image data and provides readouts at different scales. When executed by the sensor subsystem or the control and data subsystem, the first routine causes the user device to: determine a scale parameter, determine a row and/or a column to read based on the scale parameter, readout scale values based on the row and the column, and provide the scale readout. The following discussion explores these steps in more detail.

At step 1612, a scale parameter is determined by the camera sensor. In one exemplary embodiment, the scale parameter is based on the binary division of the smallest dimension. For example, an image that is $2^N \times 2^N$ would have N scales, an image that is $2^N \times 2^M$ would have the smaller of N or M scales. Resolutions that are not evenly divisible by the scale factor may be divided to the smallest scale that preserves even division. Other implementations may puncture, pad, stretch or shrink to provide even divisibility.

While most sensors capture the full resolution it is capable of, some sensors may limit the capture resolution. This may affect the resulting scale parameters and/or scaling method used. Furthermore, while the present disclosure is discussed in terms of regular scaling parameters, irregular scale parameters may be used to dynamically adjust the scaling at different scales. Larger scale parameters provide larger sampling differences between scales; for example, a scale parameter of 4 samples at $\frac{1}{4}^{th}$ the resolution of a scale parameter of 2.

In one implementation, the scale parameter may be set at the lowest scale for a first iteration, progressively incrementing for each iteration until the highest scale is reached. In other implementations, the scale parameter may be set either internally or externally; for example, a start scale and/or a stop scale may be identified by the ISP, etc. In other implementations, the scale parameter may be set at the highest scale and decreased until the lowest scale is reached. In some cases, asymmetric increments/decrements may be used for images that have asymmetric dimensionality.

At step 1614, a row and/or a column to read is determined based on the scale parameter. In one embodiment, the scale factor is used with bit-reversed addressing to identify a row to enable and/or columns to read. More generally however, artisans will appreciate that any addressing scheme may be substituted with equal success, the foregoing being purely illustrative. Other schemes may use binary or other base division, irregular division, and/or any other sampling or subdivision scheme with equal success.

In one embodiment, rows are enabled according to a row address, and columns are read according to a column address. In other embodiments, columns may be enabled according to a column address and rows may be read according to a row address.

In either row-enabled or column-enabled reads, the resulting set of values may be read according to a variable set size. In other words, certain rows may have a different number of values than other rows. In one specific implementation, the scale factor is associated with a variably changing read size. For example, a scale factor of N may have a row or column read size of $2^N$ elements. In other embodiments, the scale factor may be associated with a fixed read size. For example, all reads may be organized in sets of 2, 4, 8, etc.

In some variants, the row and/or column is additionally modified by preconfigured or sensed parameters. For example, some implementations may incorporate IMU data to level-correct the image data. Other implementations may perform keystone correction or other image manipulations in advance.

While the foregoing discussion is described as a sequential instruction that is recorded to and executed from memory, the determination of row/column addressing and/or read size may be embodied as a dedicated circuit for control of the row and/or column addressing logic.

At step 1616, scale values are read to create a scaled readout based on the row and the column. The scaled readout is provided for downstream processing (step 1618).

In one embodiment, the scaled readout comprises a string of values associated with specific locations of the scaled image data. In one exemplary embodiment, the string of values is bit-reversed ordered. In other embodiments, the string of values may be sequentially ordered. In some embodiments, the string of values may skip or ignore rows or columns that have been previously read. Still other schemes may designate an order based on downstream processing constraints and/or other external (off-chip) constraints.

In some implementations, the scaled readout is written into memory buffers. In some embodiments, the memory buffers are specific to a scale. For example, a memory buffer for the $Y^{th}$ scale might be sized according to $N^Y \times M^Y$. In some cases, the memory buffers may be determined based on application specific constraints. In other cases, the memory buffers may be dynamically determined based on runtime considerations.

In other embodiments, the scaled readout is written into a single memory buffer. The memory buffer may be sized according to the largest scale; each scale readout is written to the spatial coordinates within the memory buffer that correspond to the image location. In some variants, the memory buffer may include memory management logic to enable concurrent read access to locations of the memory buffer that are not associated with the current scale being written.

In some implementations, the memory buffers may be located at the sensor. In other implementations, the memory buffers may be located at a processor. Still other implementations may locate the memory buffers within system memory that is may be allocable to any logic of the system.

In some embodiments, scale specific derived image data and/or statistics may also be generated. For example, integral images for a scaled readout may be generated at the same time. In some cases, the integral image may be associated with a single scale. In other cases, a cross-scale integral image may include integral image data from one or more scales.

Various embodiments enable access to previously written scales of information while current scales are being written. Concurrent non-blocking access allows other downstream processing to begin processing lower scaled readouts before higher scaled readouts have completed.

In some embodiments, the non-transitory computer-readable medium also includes a second routine that performs scale specific analysis on scale readouts. When executed by the sensor subsystem or the control and data subsystem, the second routine causes the user device to: obtain a scale readout, perform computer vision analysis at a scale parameter, and determine whether to continue processing or terminate processing. The following discussion explores these steps in more detail.

At step 1622, a processor obtains a scaled readout. In some embodiments, the processing logic may be on-chip at the camera sensor e.g., the processing logic may share the same power state and/or clock domain as the sensor. In other embodiments, the processing logic may be off-chip e.g., the processing logic may have distinct power states and/or clocking.

In some embodiments, the scaled readout may be pushed (sent) or pulled (retrieved) from the camera sensor as a data structure. In some embodiments, the scaled readouts may be signaled or otherwise received over a bus, wired/wireless interface, or other transitory signaling medium.

The scaled readout may be provided via data structure or signaling to any processing unit. Common signaling mechanisms may include e.g., hardware interrupts, software interrupts, bus signaling. Common data structure mechanisms may include e.g., memory buffers, data packets, and/or direct memory access (DMA) type delivery.

The processor may be an image signal processor (ISP), central processing unit (CPU), graphics processing unit (GPU), digital signal processor (DSP), neural network processing unit (NPU) or any other processing logic configured to perform computer vision analysis at a specific scale.

At step 1624, a computer vision analysis of the scaled readout is performed to generate a result. The result may be used to determine whether to continue processing or terminate processing (step 1626). As but one such example, an ISP may have a computer vision algorithm that is trained to detect an object within a first scale and recognize an object from a library of object types within a second scale. Unsuccessful detection can be used to skip the more difficult recognition processing; significant resources may be saved by processing simpler tasks at reduced scales first.

In other embodiments, the result may be used to determine the next stage of processing. For example, a classification task may be used to determine whether to perform object recognition, facial recognition, or text recognition at the next scale. This may be much more efficient than using a single scale for classification and recognition.

More generally, computer vision tasks generally include object detection, object recognition, object classification, object localization, image segmentation, image enhancement, optical character recognition, pose estimation, and/or scene reconstruction. Different tasks are associated with different levels of complexity; in addition, scale often increases computing complexity at quadratic or even exponential rates. Thus, careful orchestration of the type and/or duration of computer vision analysis may greatly reduce operational system costs.

In one embodiment, the computer vision analysis occurs in parallel with sensor readout of another scale. For example, a computer vision analysis may be performed at a first scale while additional image data from a higher scale is being readout.

In one embodiment, the computer vision analysis occurs in parallel with another computer vision task of another scale. For example, a first computer vision task executed on-sensor may be run in parallel with a second computer vision task (at a different scale) executed on an ISP.

While the foregoing examples are presented in the context of smart glasses applications, the concepts may be broadly extended to a variety of embedded and/or mobile applications including e.g., wearables, vehicles, and/or IoT and/or IIoT applications. Examples of such devices may include smart cars, smart doorbells, smart appliances, surveillance cameras, etc.

While the foregoing examples are shown with a specific division of processing logic and memories, other variants may subdivide, aggregate, and/or merge the tasks among any number of control and data processing logic. For example, the tasks may be performed entirely within one chip (e.g., no off-chip data transfers) or one device (e.g., no off-device transfers). Alternatively, the tasks may be performed across multiple chips and/or incorporate multiple devices (e.g., staged processing complexity).

Power Management Subsystem

The power management subsystem provides power to the system. Typically, power may be sourced from one or more power sources. Examples of power sources may include e.g., disposable and/or rechargeable chemical batteries, charge storage devices (e.g., super/ultra capacitors), and/or power generation devices (e.g., fuel cells, solar cells). Rechargeable power sources may additionally include charging circuitry (e.g., wired charging and/or wireless induction). In some variants, the power management subsystem may additionally include logic to control the thermal exhaust and/or power draw of the power sources for wearable applications.

During operation, the power management subsystem provides power to the components of the system based on their power state. In one exemplary embodiment, the power states may include an "off" or "sleep" state (no power), one or more low-power states, and an "on" state (full power). Transitions between power states may be described as "putting to sleep", "waking-up", and their various linguistic derivatives.

As but one such example, a camera sensor's processor may include: an "off" state that is completely unpowered; a "low-power" state that enables power, clocking, and logic to check interrupts; a "on" state that enables image capture. During operation, another processor may "awaken" the camera sensor's processor by providing power via the power management subsystem. After the camera sensor's processor enters its low-power state, it services the interrupt; if a capture is necessary, then the camera sensor's processor may transition from the "low-power" state to its "on" state.

Various other power management subsystems may be substituted with equal success, given the contents of the present disclosure.

Data/Network Interface Subsystem

Functionally, the data/network interface subsystem enables communication between devices. For example, smart glasses may communicate with a companion device during operation. The companion device may be a smartphone, a computing device, a computer, a laptop, a server, a smart television, a kiosk, an interactive billboard, etc. In some cases, the system may also need to access remote data (accessed via an intermediary network). For example, a user may want to look up a menu from a QR code (which visually embeds a network URL) or store a captured picture to their social network, social network profile, etc. In some cases, the user may want to store data to removable media. These transactions may be handled by a data interface and/or a network interface.

The network interface may include both wired interfaces (e.g., Ethernet and USB) and/or wireless interfaces (e.g., cellular, local area network (LAN), personal area network (PAN)) to a communication network. As used herein, a "communication network" refers to an arrangement of logical nodes that enables data communication between end-points (an endpoint is also a logical node). Each node of the communication network may be addressable by other nodes; typically, a unit of data (a data packet) may be traverse across multiple nodes in "hops" (a segment between two nodes). For example, smart glasses may directly connect, or indirectly tether to another device with access to, the Internet. "Tethering" also known as a "mobile hotspot" allows devices to share an internet connection with other devices. For example, a smart phone may use a second network interface to connect to the broader Internet (e.g., 5G/6G cellular); the smart phone may provide a mobile hotspot for a smart glasses device over a first network interface (e.g., Bluetooth/Wi-Fi), etc.

The data interface may include one or more removeable media. Removeable media refers to a memory that may be attached/removed from the system. In some cases, the data interface may map ("mount") the removable media to the system's internal memory resources to expand the system's operational memory.

It will be appreciated that the various ones of the foregoing aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A method, comprising:
   exposing an array of photosites to capture light information;
   enabling a first row of the array based on a first scale;
   reading a first column of the array based on the first scale discharging at least one photosite of the array;
   providing a first scaled readout of the array;
   enabling a second row based on a second scale;
   reading the first column based on the second scale skipping at least one previously discharged photosite of the array; and
   providing a second scaled readout of the array, where the first scaled readout and the second scaled readout correspond to a single exposure.

2. The method of claim 1, where the first scaled readout comprises a first value from the first column and a first non-sequential value from a second column.

3. The method of claim 2, where the second scaled readout comprises a second value from the first column and a second non-sequential value from the second column.

4. The method of claim 1, further comprising storing the first scaled readout to a first memory buffer and storing the second scaled readout to a second memory buffer.

5. The method of claim 4, further comprising processing the first scaled readout from the first memory buffer while the second scaled readout is written to the second memory buffer.

6. The method of claim 1, where enabling the first row of the array comprises enabling shift registers based on the first scale.

7. The method of claim 1, where discharging the at least one photosite of the array is distructive preventing re-reading an electrical potential from the at least one photosite.

8. A camera module, comprising:

an array of photosites arranged by rows and columns;

a scalable row enable logic configured to enable a first row based on a first scale;

a scalable column read logic configured to read a first value from a first column and a second value from a second column in a bit-reversed address order based on the first scale; and output logic configured to provide a first scaled readout comprising the first value and the second value.

9. The camera module of claim 8, where the scalable row enable logic is further configured to enable a second row in the bit-reversed address order based on the first scale.

10. The camera module of claim 8, where the output logic comprises a memory buffer.

11. The camera module of claim 8, where the output logic comprises a bus and the first scaled readout is signaled to a processor.

12. The camera module of claim 8, where the first scale is based on a scale factor, and the scale factor is based on a binary division of a smallest dimension of the array of photosites.

13. The camera module of claim 8, where the scalable row enable logic is configured to enable the first row based on a bit-reversed address order based on the first scale.

14. The camera module of claim 8, where the bit-reversed address order includes at least one of a row offset and a column offset.

15. A camera sensor, comprising:

an array of photosites configured to capture light information;

a scalable row enable logic configured to:

enable a first row of the array of photosites based on a first scale; and enable a second row based on a second scale;

a scalable column read logic configured to:

read a first scaled readout of a first column of the array of photosites based on the first scale discharging at least one photosite of the array of photosites; and read a second scaled readout of the first column based on the second scale skipping at least one previously discharged photosite; and output logic configured to:

provide the first scaled readout of the array; and provide the second scaled readout of the array, where the first scaled readout and the second scaled readout correspond to a single exposure of the array of photosites.

16. The camera sensor of claim 15, where the output logic comprises a bus and the first scaled readout and the second scaled readout are signaled to a processor.

17. The camera sensor of claim 15, where the output logic comprises a first memory buffer and the first scaled readout is stored in the first memory buffer.

18. The camera sensor of claim 17, where the output logic further comprises a second memory buffer and the second scaled readout is stored in the second memory buffer.

19. The camera sensor of claim 17, where the output logic further comprises a second memory buffer and the first scaled readout is stored in the second memory buffer and the second scaled readout is stored in the second memory buffer.

20. The camera sensor of claim 15, where the first scaled readout is provided before the second scaled readout is completed.

* * * * *